United States Patent
Shabtay

(10) Patent No.: US 7,623,449 B2
(45) Date of Patent: Nov. 24, 2009

(54) POLICY AWARE FRAME LOSS MEASUREMENT

(75) Inventor: Lior Shabtay, Ramat Gan (IL)

(73) Assignee: Atrica Israel Ltd., Hod Hasharon (IL)

( * ) Notice: Subject to any disclaimer, the term of this patent is extended or adjusted under 35 U.S.C. 154(b) by 472 days.

(21) Appl. No.: 11/383,207

(22) Filed: May 14, 2006

(65) Prior Publication Data

US 2007/0263535 A1 Nov. 15, 2007

(51) Int. Cl.
H04L 12/26 (2006.01)
(52) U.S. Cl. ...................................... 370/230
(58) Field of Classification Search ................ 370/229, 370/230, 230.1, 232, 234, 235, 235.1
See application file for complete search history.

(56) References Cited

U.S. PATENT DOCUMENTS

| | | | | |
|---|---|---|---|---|
| 5,633,861 | A * | 5/1997 | Hanson et al. | 370/232 |
| 6,370,116 | B1 * | 4/2002 | Giroux et al. | 370/232 |
| 6,505,244 | B1 * | 1/2003 | Natarajan et al. | 709/223 |
| 6,643,612 | B1 | 11/2003 | Lahat et al. | 702/186 |
| 7,293,080 | B1 * | 11/2007 | Clemm et al. | 709/223 |
| 7,492,779 | B2 | 2/2009 | Schzukin et al. | 370/412 |
| 2005/0099949 | A1 * | 5/2005 | Mohan et al. | 370/236.2 |
| 2005/0157751 | A1 * | 7/2005 | Rabie et al. | 370/466 |

OTHER PUBLICATIONS

U.S. Appl. No. 10/631,451, filed Jul. 30, 2003, Shabtay et al.
K. Kompella et al., "Detecting Multi-Protocol Label Switched (MPLS) Data Plane Failures", RFC 4379, Internet Engineering Task Force, Feb. 2006.
R. Koodli et al., "One-Way Loss Pattern Sample Metrics", RFC 3357, Internet Engineering Task Force, Aug. 2002.
V. Paxson et al., "Framework for IP Performance Metrics", RFC 2330, Internet Engineering Task Force, May 1998.
O. Stokes et al., "Testing Hierarchical Virtual Private LAN Services", draft-stokes-vkompella-l2vpn-hvpls-oam-00.txt, Oct. 2004.

(Continued)

*Primary Examiner*—Derrick W Ferris
*Assistant Examiner*—Mohammad Anwar
(74) *Attorney, Agent, or Firm*—Zaretsky Patent Group PC; Howard Zaretsky

(57) ABSTRACT

A novel mechanism for performing policy aware frame loss measurements that overcomes the problems of the prior art. The mechanism permits OAM frames to travel through the network in the same way data frames travel marked as green or yellow. The frame loss measurement is policy aware (i.e. SLA aware), taking CIR and EIR policy as well as policy in the middle of the network into consideration. In one embodiment, the value of the policer at the ingress to the client side is read just before sending an OAM frame and a potential decision value is calculated which reflects the decision that the policer would have taken if given the OAM frame at that time. If the calculated decision is to send the OAM frame as green or yellow, the frame is sent as green or yellow, accordingly. If, however, the calculated decision is to drop the frame, the frame is randomly marked as either green or yellow in accordance with the ratio of CIR to EIR. In another embodiment, red traffic (i.e. dropped frames) is simulated using CIR and EIR counters. In another embodiment, frame loss measurements are made that take into account the action taken by policers in the middle of the network.

31 Claims, 10 Drawing Sheets

OTHER PUBLICATIONS

D. Mohan et al., "L2VPN OAM Requirements and Framework", draft-ietf-l2vpn-oam-req-frmk-05.txt, Mar. 2006.
L. Anderson et al., "Framework for Layer 2 Virtual Private Networks (L2VPNs)", draft-ietf-l2vpn-l2-framework-05.txt, Jun. 2004.
M. Lasserre et al., Virtual Private LAN Services over MPLS, draft-ietf-l2vpn-vpls-ldp-08.txt, Nov. 2005.
K. Kompella et al., "Virtual Private LAN Service", draft-ietf-l2vpn-vpls-bgp-06.txt, Dec. 2005.
D. Katz et al., "Generic Application of BFD", draft-ietf-bfd-generic-01.txt, Oct. 2005.
"Ethernet now offers the most comprehensive OAM for packet-based solutions", Nortel White Paper, http://www.nortel.com/solutions/collateral/nn119660.pdf, 2006.
P. Indoo, "Ethernet OAM", International Engineering Consortium, http://www.iec.org/newsletter/march07_1/broadband_2.html, vol. 1, Mar. 2007.
MEF 6 Technical Specification, "Ethernet Services Definitions—Phase 1", Metro Ethernet Forum, Jun. 2004.
MEF 10.1 Technical Specification, "Ethernet Services Attributes Phase 2", Metro Ethernet Forum, Nov. 2006.

* cited by examiner

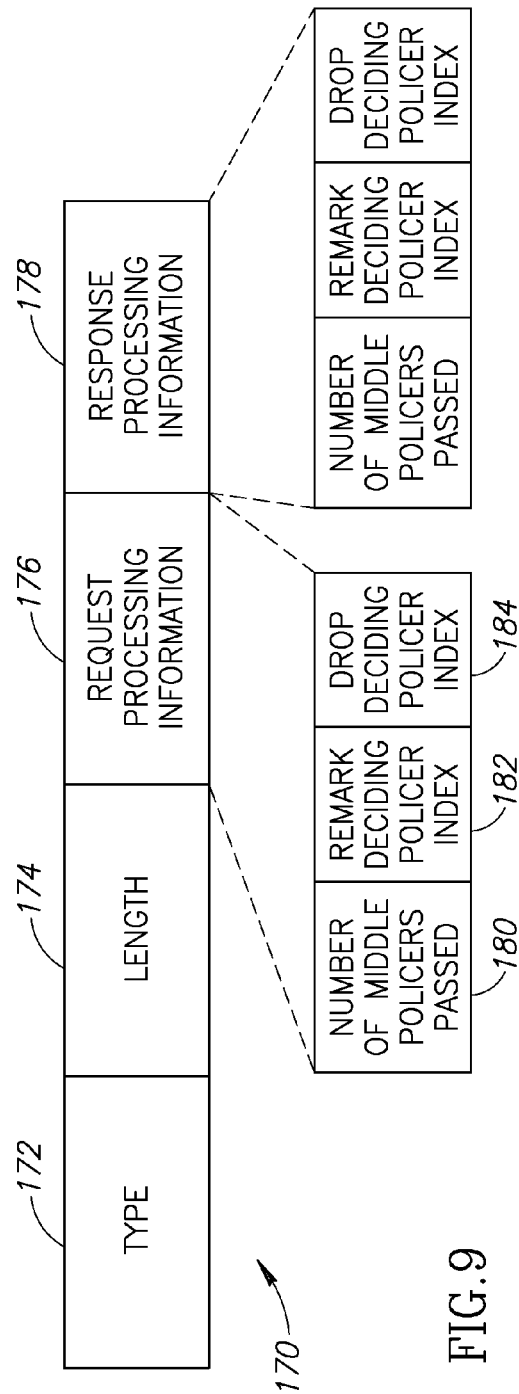

POLICY AWARE FRAME LOSS MEASUREMENT

FIELD OF THE INVENTION

The present invention relates to the field of data communications and more particularly relates to an apparatus for and method of policy aware frame/packet/cell/octet loss measurement in Metro and other types of networks.

BACKGROUND OF THE INVENTION

The growth in demand for telecommunication services is increasing at an ever-quickening pace. The majority of the demand is being driven by the explosion in the use of the Internet and a steady stream of new applications being introduced which further increase the demand for increased bandwidth. Currently, a large portion of Internet traffic is still carried by circuit switched transport facilities. In the case of Metropolitan Area Networks (MANs), most of the traffic is transported over SONET/SDH based networks most of which were originally designed for voice traffic. With time, more and more customers are using the networks for transporting data, video, and other applications, in addition to voice.

The requirements for networked communications within the user community have changed dramatically over the past two decades. Several notable trends in the user community include (1) the overwhelming domination of Ethernet as the core networking media around the world; (2) the steady shift towards data-oriented communications and applications; and (3) the rapid growth of mixed-media applications. Such applications include everything from integrated voice/data/video communications to the now commonplace exchanges of MP3 music files and also existing voice communications which have begun to migrate towards IP/packet-oriented transport.

Ethernet has become the de facto standard for data-oriented networking within the user community. This is true not only within the corporate market, but many other market segments as well. In the corporate market, Ethernet has long dominated at all levels, especially with the advent of high-performance Ethernet switching. This includes workgroup, departmental, server and backbone/campus networks. Even though many of the Internet Service Providers (ISPs) in the market today still base their WAN-side communications on legacy circuit oriented connections (i.e. supporting Frame Relay, xDSL, ATM, SONET), their back-office communications are almost exclusively Ethernet. In the residential market, most individual users are deploying 10 or 100 Mbps Ethernet within their homes to connect PCs to printers and to other PCs (in fact, most PCs today ship with internal Ethernet cards) even though the residential community still utilizes a wide range of relatively low-speed, circuit-oriented network access technologies.

The use of Ethernet, both optical and electrical based, is increasing in carrier networks due to advantages of Ethernet and particularly Optical Ethernet, namely its ability to scale from low speeds to very high rates and its commodity-oriented nature. With the rapid increase in the demand for user bandwidth, and the equally impressive increase in the performance of Ethernet with the LAN environment, the demand for Metropolitan network performance is rapidly increasing. In response, there has been a massive explosion in the amount of fiber being installed into both new and existing facilities. This is true for both the corporate and residential markets.

Transparent LAN Service (TLS), which is also referred to as multipoint-to-multipoint (MP2MP), has been identified as one of the key services to be provided by an Ethernet based metro network (MEN). A TLS that provides virtual Ethernet LAN service is called an E-LAN (Ethernet LAN service) in the MEF standard specifications. TLS implementation in MPLS networks is referred to as Virtual Private LAN Service (VPLS) in Internet Engineering Task Force (IETF) drafts. IEEE 802.1ad specifies provider bridges that implement E-LAN service by means of standard spanning-tree based bridging.

A TLS creates an emulated LAN segment for a given set of users. It provides a layer 2 broadcast domain that is capable of learning and forwarding using Ethernet MAC addresses for a given set of users.

Today, Ethernet is the predominant technology used for Local Area Network (LAN) connectivity and is gaining acceptance as an access technology as well. This is true especially in Metropolitan Area Networks (MANs) and Wide Area Networks (WANs). In a typical scenario, an Ethernet port connects a customer to the Provider Edge (PE) device. Customer traffic is subsequently mapped to a specific MPLS-based Layer 2 Virtual Private Network (VPN).

Traditional LANs provide unicast, broadcast and multicast services. Locations that belong to the same broadcast domain and that are connected via an MPLS network expect broadcast, multicast and unicast traffic to be forwarded to the proper locations. This requires MAC address learning on a per LSP basis, forwarding unicast destination traffic according to the learned information, packet replication across LSPs for multicast/broadcast traffic and for flooding of unknown unicast destination traffic.

A main goal of Virtual Private LAN Services (VPLS) is to provide connectivity between customer sites situated in the MAN or WAN as if they were connected via a LAN. To accomplish this, a major attribute of Ethernet must be provided, namely the flooding of broadcast traffic and traffic with unknown destination MAC addressed to all ports. To provide flooding within a TLS, all unicast unknown address, broadcast and multicast frames are flooded over the corresponding "pseudowires" to all relevant provider edge nodes that participate in the TLS. Note that multicast packets are a special case and are not necessarily flooded to all VPN members. A pseudowire is a made up of a pair of unidirectional virtual circuit Label Switched Paths (LSPs). Throughout this document, the term pseudowire is used to denote a point-to-point logical link connecting different nodes in the network, regardless of the technology used for its implementation, e.g., MPLS, etc. Depending on the technology, the pseudowire may be an MPLS-VC, a point-to-point VLAN-based trail, an ATM-VC, etc.

A provider edge node uses different techniques to associate packets received from the client with connections. Example techniques include port mapping and VLAN mapping in which the received packet is associated with a connection according to the provider edge device port from which it was received or according to the port from which it was received as well as the VLAN with which it is tagged, respectively. Packets mapped to a TLS connection, are forwarded to one or more of the sites associated with that particular TLS connection. In case of a TLS connection, the forwarding is performed by bridging-capable nodes throughout the network, that bridge between pseudowires dedicated to that TLS. The pseudowires are point-to-point 'sub-connections' of that TLS, functioning to connect the bridging-capable nodes. These bridging capable nodes must be able to first associate the received packet with a TLS and then, within the context of the TLS, associate a destination MAC address (or a destination MAC-address and VLAN-tag value) with a pseudowire comprising that TLS in order to forward a packet. It is not practical to require these provider nodes to statically configure an association of every possible destination MAC address with a pseudowire. Thus, a bridging mechanism is required to dynamically learn MAC addresses (or MAC-address and VLAN pairs) on both physical ports and virtual circuits and to forward and replicate packets across both physical ports and pseudowires to which they are associated.

The Ethernet LAN Service (E-LAN Service) is defined by the MEF as a service that provides multipoint connectivity, i.e. it may connect two or more UNIs. Subscriber traffic sent from one UNI can be received at one or more of the other UNIs. In the simplest case, each site (UNI) can be set up to be a member of the same Virtual LAN (VLAN). As new UNIs (i.e. sites) are added, they can be made members of the same VLAN thus simplifying provisioning and service activation.

Bridging functionality operates on the original Layer 2 portion of the packet. The bridge functions to learn new source MAC addresses of ingress packets and to associate them with the outbound pseudowire it is to be sent out on.

Various techniques can be used to provide the forwarding functionality in a TLS. One technique is known as spanning-tree based transparent bridging as described in the IEEE 802.1 standard. In this bridging technique the nodes in the network connect through a tree of point-to-point pseudowires. Standard bridging is performed between them using the pseudowires between them as links over which bridging is performed. Specifically, the standard for provider bridges is specified in IEEE 802.1ad.

A second bridging technique is a variation of the first one described above and is known as split-horizon bridging in which each endpoint of the TLS is connected through a point-to-point pseudowire to each of the other components. Each endpoint performs a bridging decision as to whether to forward each packet to a specific destination through the point-to-point pseudowire leading to it, or to forward the packet to all or some of the destinations (i.e. through all or some of the point-to-point pseudowires). Thus, all bridges are connected in a full mesh pattern whereby packets pass at most only two bridges. A disadvantage of this technique is that it is not scalable and thus requires a large number of pseudowires as the TLS size increases (in the number of endpoints).

A third technique known as link redundancy uses a single bridging device connected in a dual-homed fashion to a bridging domain using two different pseudowires. The device chooses one of the pseudowires for working at any single point in time.

Note that a single TLS service may be constructed from a number of domains, each implemented using one of the bridging techniques described above.

One of the key features provided by Metro networks is enhanced SLA support. In many networks, the key for providing SLA to services is to enforce limits on the traffic rates allowed from each service and on the traffic rates of each service for which the SLA is applied. This is usually performed by using policers at the ingress or other points in the network. The policers may drop or mark the traffic with an indication of the treatment that it should get in the rest of the network. In order to provide enhanced SLA support, however, the network must provide appropriate SLA measurement capabilities. Service level agreements typically include parameters and constraints for bandwidth (i.e. frame loss ratio), delay, delay variation (i.e. jitter) and availability. It is commonly required that provider networks provide packet loss measurements for the transport facilities they provide. Customers typically want information on the number of packets that did not make it to their destination. The end-to-end Service Level Agreement (SLA) measurement mechanisms and protocol described in U.S. Pat. No. 6,643,612, entitled "Mechanism And Protocol For Per Connection Based Service Level Agreement Measurement," incorporated herein by reference in its entirety, provides very accurate calculation of delay, jitter and bandwidth (i.e. packet/frame/octet loss) for point-to-point connections.

There is thus a need for a mechanism that statistically measures frame/packet loss for TLS/VPLS/E-LAN service connections and other (L3VPN, P2P, IP-forwarding) services. The statistical frame loss measurement mechanism should further be able to both distinguish and measure losses caused by different reasons. Specifically, the mechanism should be able to distinguish between frame/packets losses that are policy based versus those that are caused by other reasons such as congestion or noise.

SUMMARY OF THE INVENTION

The present invention is a mechanism for performing policy aware frame loss measurements that overcomes the problems and disadvantages of the prior art. The mechanism permits OAM frames to travel through the network in the same way data frames travel marked as green or yellow. The frame loss measurement is policy aware (i.e. SLA aware). The invention takes CIR and EIR based policy that is enforced at the ingress of the network as well as policy that is enforced in the middle of the network into consideration.

In one embodiment, the current status of the respective policer at the ingress to the client side is read when sending an OAM frame. If the policer status read indicates that it would allow sending the OAM frame as green or yellow if passed through it, the frame is sent as green or yellow, accordingly. If, however, the policer status read indicates that it would drop the frame if passed through it, the frame is randomly marked as either green or yellow in accordance with the ratio of CIR to EIR configured to the respective policer.

In another embodiment, red traffic (i.e. dropped frames) is simulated using counters. Time is divided into cycles and for each cycle the CIR and EIR counters, which count the traffic of the service that is forwarded at the ingress, according to their marking, are examined. For each OAM message a random decision whether to mark as green or yellow is made according to the proportion of what occurred in the previous cycle. This has the advantage of being simpler to implement but with slightly less accuracy since the method looks at traffic history and not the current traffic status.

In another embodiment, frame loss measurements are made that include the action taken by policers in the middle of the network. The policers in the middle of the network are referred to as color aware policers which take into account the original color of the frames (e.g., the one given by the respective ingress policer) in making their marking decisions. A yellow frame is never made green, but a green frame may be made yellow or dropped and a yellow frame may be dropped. The middle policers are configured by the operator.

The middle policer is able to distinguish between OAM and other types of frames. The policer will pass some frames and drop others. Rather than a policer dropping an OAM frame that is out of its profile, the policer gives it a high priority and inserts an indication in the frame that the frame was about to be dropped (i.e. that the decision of the policer was to drop it). At the endpoint of the connection that generates the statistics, this frame represents in actuality a frame that was dropped by the policer. Consider that the policer in the middle of the network receives the frame already colored by the ingress policer and now decides to drop it. Without the mechanism of the present invention, the OAM frame that would be dropped by the middle policer will be counted as a lost OAM frame at the end of the connection that makes the statistics calculations, and therefore there will be no information as to whether the frame was dropped due to policy or due to a different reason, such as congestion, noise, malfunctioning device, etc. Thus, rather than drop the frame, the mechanism ensures that the frame arrives at the other end of the connection with an indication that it would have been dropped.

Further, the mechanism provides an operator a choice whether to allow the middle policer to remark OAM frames (e.g., from green to yellow). In one case, the OAM frames are kept green but an indication that the policer decided to remark is added to the frame thus providing an indication of how many frames were remarked. In another case, the OAM frames to be marked yellow are remarked (made yellow) thus providing a measurement of overall frame loss. An operator can correlate between the two measurements and gain a better understanding of how many frames were remarked by a middle policer as discard-eligible and then dropped by the network due to higher discard-eligibility. At the client side, two frames (each belonging to a different measurement) are generated and sent. Two statistics modules also perform separate computations. A flag is added in the frame ('remark' flag) which instructs the policer whether to remark the frame or not. The result is two statistical measurements: (1) statistics of the percentage of loss in the network, i.e. provides overall real frame loss statistics; and (2) statistics about the percentage of frames that were remarked by policers.

The present invention is suitable for use in networks that require packet loss measurements wherein the networks perform bridging including the flooding of broadcast, multicast and unknown traffic. In particular, the invention is applicable in provider edge and core switches in Metro Ethernet Networks (MENs) and Metropolitan Area Networks (MANs) that implement E-Line (P2P), E-LAN (TLS connections, VPLS connections, 802.1ad or any other bridged network connections). Note that the invention is applicable in any network that employs bridging domains including TLS connections in MENs and bridged LAN networks such as based on standard Ethernet.

It is important to also note that the invention is not limited by the type of network in use, the PHY layer, the type of signaling in use or by whether provisioning is based on signaling or performed in the management plane. The invention is applicable to other networks as well.

Note also that the invention is suited for implementation in hardware such as a network processor (which may comprise a network-processor chip, an FPGA, an ASIC, etc.), adapted to implement the packet loss measurement mechanism of the present invention, software or a combination of hardware and software. In one embodiment, a network device comprising a processor, memory, etc. is operative to execute software adapted to perform the packet loss measurement mechanism of the present invention.

There is thus provided in accordance with the invention, a method of measuring frame loss for use at the ingress to a network, the method comprising the steps of maintaining a committed information rate (CIR) counter and an excess information rate (EIR) counter, preparing a measurement frame to be transmitted over the network, calculating a ratio of CIR to EIR traffic, randomly deciding a marking decision in accordance with the ratio and marking the measurement frame in accordance with the marking decision.

There is also provided in accordance with the invention, a method of measuring frame loss for use at the ingress to a network, the method comprising the steps of preparing a measurement frame to be transmitted over the network, deciding an action to take on the measurement frame in accordance with a decision value calculated according to the current status of an ingress policer, if the decision is to drop the measurement frame then randomly deciding a marking decision in accordance with the ratio between the configured committed information rate (CIR) and excess information rate (EIR), marking the measurement frame in accordance with the marking decision and otherwise marking the measurement frame in accordance with the decision.

There is further provided in accordance with the invention, a method of measuring frame loss for use in the middle of a network, the method comprising the steps of maintaining a committed information rate (CIR) counter and an excess information rate (EIR) counter, receiving a measurement frame over the network, applying color aware policing to the measurement frame and generating a decision based thereon, setting a flags field within the measurement frame in accordance with the decision and forwarding the measurement frame over the network in accordance with a forwarding flag and the decision.

There is also provided in accordance with the invention, a provider edge switch for use at the ingress to an Ethernet based network comprising a plurality of line cards incorporating one or more ports for interfacing the provider edge switch to one or more users, each line card comprising a plurality of ports, each port coupled to a communication link, a packet processing engine coupled to the plurality of ports, the packet processing engine for determining forwarding decision and destination queue for each ingress packet, a queue manager coupled to the packet processing engine, a loss measurement module for measuring frame loss for Transparent LAN Services (TLS) connections in a metro Ethernet network (MEN), the loss measurement module comprising maintaining a committed information rate (CIR) counter and an excess information rate (EIR) counter, preparing a measurement frame to be sent over the network, calculating a ratio of CIR to EIR traffic, randomly deciding a marking decision in accordance with the ratio, marking the measurement frame in accordance with the marking decision and switching means coupled to the queue manager and adapted to provide switching fabric functionality to the provider edge switch.

There is further provided in accordance with the invention, a provider edge switch for use at the ingress to an Ethernet based network comprising a plurality of line cards incorporating one or more ports for interfacing the provider edge switch to one or more users, each line card comprising a plurality of ports, each port coupled to a communication link, a packet processing engine coupled to the plurality of ports, the packet processing engine for determining forwarding decision and destination queue for each ingress packet, a queue manager coupled to the packet processing engine, a loss measurement module for measuring frame loss for a plurality of connections in a metro Ethernet network (MEN), the loss measurement module comprising maintaining a committed information rate (CIR) counter and an excess information rate (EIR) counter, preparing a measurement frame to be sent over the network, deciding an action to take on the frame in accordance with a decision value calculated according to the current status of an ingress policer, if the decision is to drop the measurement frame then randomly deciding a marking decision in accordance with the ratio between the configured CIR and EIR, marking the measurement frame in accordance with the marking decision, otherwise marking the measurement frame in accordance with the decision and switching means coupled to the queue manager and adapted to provide switching fabric functionality to the provider edge switch.

There is also provided in accordance with the invention, a provider core switch for use in the middle of an Ethernet based network comprising a plurality of line cards incorporating one or more ports for interfacing the provider switch to other provider switches, each line card comprising a plurality of ports, each port coupled to a network communications link, a packet processing engine coupled to the plurality of ports, the packet processing engine for determining forwarding decision and destination queue for each ingress packet, a queue manager coupled to the packet processing engine, a loss measurement module for measuring frame loss for a plurality of connections in a metro Ethernet network (MEN), the loss measurement module comprising receiving a measurement frame over the network, applying color aware policing to the measurement frame and generating a decision based thereon, setting a flags field within the measurement frame in accordance with the decision, forwarding the measurement frame over the network in accordance with a forwarding flag and the decision and switching means coupled to the queue manager and adapted to provide switching fabric functionality to the provider core switch.

BRIEF DESCRIPTION OF THE DRAWINGS

The invention is herein described, by way of example only, with reference to the accompanying drawings, wherein:

FIG. 8 is a diagram illustrating the flags field of the frame of FIG. 7 in more detail;

FIG. 9 is a diagram illustrating the frame format of a TLV frame as provided in accordance with the present invention;

DETAILED DESCRIPTION OF THE INVENTION

Notation Used Throughout

Figure 1:
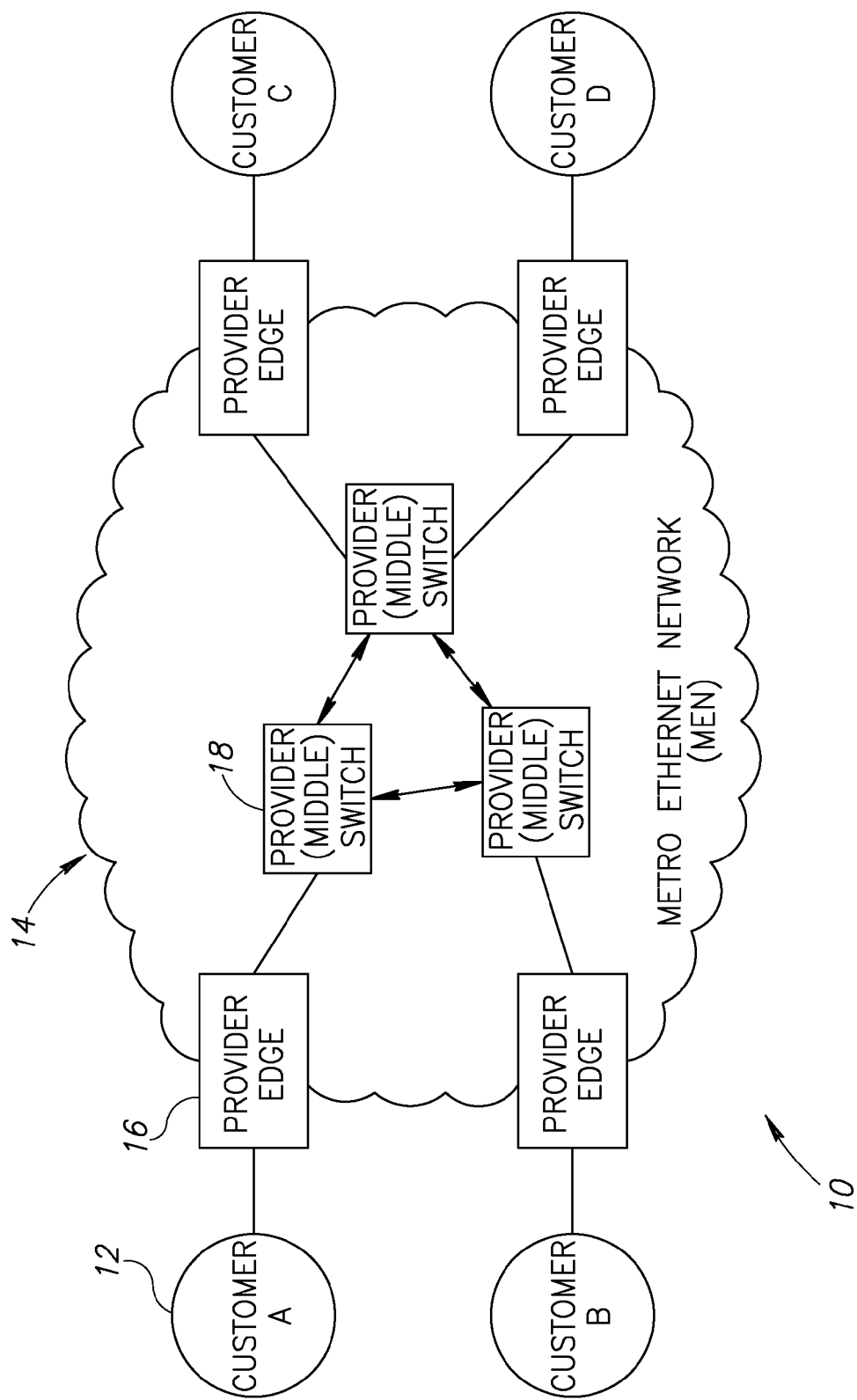
FIG. 1 is a block diagram illustrating an example metro Ethernet network providing transparent LAN services to a plurality of clients and comprising a plurality of provider edge and provide core switches.

The following notation is used throughout this document.

| Term | Definition |
| --- | --- |
| ASIC | Application Specific Integrated Circuit |
| ATM | Asynchronous Transfer Mode |
| CD-ROM | Compact Disc-Read Only Memory |
| CIR | Committed Information Rate |
| CLP | Cell Loss Priority |
| CPU | Central Processing Unit |
| CSIX | Common Switch Interface |
| DA | Destination Address |
| DAT | Digital Audio Tape |
| DE | Discard Eligibility |
| DSCP | Differentiated Services Code Point |
| DSL | Digital Subscriber Line |
| DSP | Digital Signal Processor |
| DVD | Digital Versatile Disk |
| EEPROM | Electrically Erasable Programmable Read Only Memory |
| EIR | Excess Information Rate |
| E-Line | Ethernet Line Service |
| E-LAN | Ethernet LAN Service |
| EPROM | Erasable Programmable Read Only Memory |
| FDDI | Fiber Distributed Data Interface |
| FE | Fast Ethernet |
| FPGA | Field Programmable Gate Array |
| GE | Gigabit Ethernet |
| IEEE | Institute of Electrical and Electronic Engineers |
| IETF | Internet Engineering Task Force |
| IP | Internet Protocol |
| ITU | International Telecommunication Union |
| L3VPN | Layer 3 Virtual Private Network |
| LAN | Local Area Network |
| LSP | Label Switched Path |
| LSR | Label Switched Router |
| MAC | Media Access Control |
| MAN | Metropolitan Area Network |
| MEF | Metro Ethernet Forum |
| MEN | Metro Ethernet Network |
| MP2MP | Multipoint-to-Multipoint |
| MPLS | Multi-Protocol Label Switching |
| NIC | Network Interface Card |
| NMS | Network Management System |
| NNI | Network to Network Interface |
| OA&M | Operations, Administration & Maintenance |
| OSPF | Open Shortest Path First |
| P2P | Point to Point |
| PC | Personal Computer |
| PDH | Plesiochronous Digital Hierarchy |
| PDU | Protocol Data Unit |
| PE | Provider Edge |
| PPE | Packet Processing Engine |
| QoS | Quality of Service |
| RFC | Request for Comment |
| ROM | Read Only Memory |
| RPR | Resilient Packet Ring |
| SA | Source Address |
| SDH | Synchronous Digital Hierarchy |
| SLA | Service Level Agreement |
| SLS | Service Level Specification |
| SONET | Synchronous Optical Network |
| TDM | Time Division Multiplexing |
| TLS | Transparent LAN Services |
| TLV | Type, Length, Value |
| UDP | User Datagram Protocol |
| UNI | User to Network Interface |
| VID | VLAN Identifier |
| VLAN | Virtual Local Area Network |
| VPLS | Virtual Private LAN Service |
| VPN | Virtual Private Network |
| VPLS-TE | Virtual Private LAN Service-Traffic Engineering |
| WAN | Wide Area Network. |

The present invention comprises an apparatus for and method of policy aware packet loss measurement for connections and services such as TLS, VPLS, E-LAN, IEEE 802.1ad provider bridge, L3VPN, P2P, IP-forwarding, etc. in MENs or other types of Ethernet networks that overcomes the problems of the prior art. The mechanisms of the present invention provide the capability of statistically measuring frame/packet loss whereby it is possible to distinguish between and measure frame losses due to different causes. A key benefit of the invention is the ability to both distinguish between frame losses due to policy related reasons and frame loses due to congestion, noise or other reasons.

An example embodiment is provided to illustrate the policy aware packet loss measurement mechanism of the present invention. It is not intended, however, that the invention be limited to the configurations and embodiments described herein. It is appreciated that one skilled in the networking, electrical and/or software arts may apply the principles of the present invention to numerous other types of networking devices and network configurations as well, including other types of synchronous data streams and asynchronous transport networks without departing from the spirit and scope of the invention.

In particular, the invention is not limited to the use of TLS, VPLS, E-LAN, IEEE 802.1ad, L3VPN, P2P or any other type of connection or service. Further, the form of access from the customer to the provider network is also not crucial to the invention.

Throughout this document, the terms packet and frame are used interchangeably and are intended to denote a protocol data unit (PDU) adapted to transport data and/or control information from one point to another.

A block diagram illustrating an example metro Ethernet network providing transparent LAN services to a plurality of clients and comprising a plurality of provider edge and provider core switches is shown in FIG. 1. The example network, generally referenced 10, comprises a plurality of customers 12, labeled customer A through D, connected to a Metro Ethernet Network (MEN) 14. The customers are connected to the MEN via a plurality of provider edge switches 16. A plurality of provider (middle or core) switches 18 make up the inner portion of the MEN. Each provider edge switch is connected to a provider middle (or core) switch.

The provider edge switches and the provider middle (or core) switches are operative to implement the policy aware frame loss measurement mechanism of the present invention in addition to performing standard edge and core switch functions.

The provider edge devices 16 are interconnected via pseudowires (or actual wires) and appear as a single emulated LAN to the clients 12. The provider edge devices may be interconnected through additional core nodes that provide bridging between these pseudowires. Provider edge devices may also contain a bridging function between their UNIs and the pseudowires belonging to the TLS. Each device having TLS bridging functionality is adapted to learn remote MAC address (or MAC address and VLAN tag) to pseudowire associations from traffic received over these pseudo wires and to also learn source MAC address to user port associations from traffic received over user ports. One of two methods for provisioning a TLS is typically used: a management based method or signaling based method. With management based provisioning, a management entity allocates the bridging resources to be used at the different nodes and provisions the pseudowires between them. With signaling based provisioning, the provider edge device typically comprises an edge router capable of running a signaling protocol and/or routing protocols used to configure pseudowires. In addition, it is capable of configuring transport tunnels to other provider edge devices and transporting traffic over these tunnels.

Policing at the Ingress of the Network

In metro Ethernet markets, one of the parameters that can be selected is the Quality of Service (QoS). Quality of service is a term which refers to the set of performance parameters that characterize the traffic over a given connection. Several different classes or levels of QoS are defined two of which are committed traffic and best effort traffic. To enable many services in the metro Ethernet market, a critical QoS parameter is committed information rate (CIR) versus excess information rate (EIR). Committed traffic is guaranteed to make it through the network with a very high probability and should have a very low probability of being dropped. This is a higher class of service and the customer pays a premium for it.

The excess traffic, however, is not guaranteed to make it through the network and may be provided on a best effort basis. This means that the committed traffic is serviced first and excess traffic is serviced using any bandwidth left in each section in the system. Note that EIR is usually not a service of its own but rather is the EIR portion of the same service. For example, a policer may be used at the ingress of the provider network to decide which part of the traffic of a service is excess traffic and therefore should be marked as discard-eligible, and which is committed traffic and therefore should not be marked as discard eligible. As described below, different frames of the same service may be marked as committed or excess traffic according to the bandwidth profile defined in the Service Level Specification (SLS) of that service. From an overall network point of view, the expectation of the service provider and the customer is that if a customer pays a premium for the committed bandwidth of the service, then committed customer traffic will not be dropped. The expectation of the service provider is that the excess traffic will always be dropped before committed traffic is dropped if at all. Note also that excess traffic is not the same as best effort traffic. For example, there may be a high priority service with excess traffic that is not within its SLA profile.

The Metro Ethernet Forum (MEF) defines Committed Information Rate (CIR) and Excess Information Rate (EIR) values for an Ethernet service. One way to provide the CIR/EIR capability is to use a dual-rate policer at the ingress of the network. For each frame, the policer decides whether it is part of the CIR traffic, part of the EIR traffic or out of profile (in which case the frame is dropped).

To be able to distinguish between committed traffic and excess traffic, in the edge of metro networks, the traffic is classified and policed according to the Service Level Agreement (SLA). The traffic identified from the SLA or from the results of a traffic policing mechanism as excess traffic is marked as discard eligible (DE) while the traffic identified as committed traffic is marked as non-discard eligible. This scheme is also known as the three-color coloring scheme, in which a dual-rate policer marks frames as either green (i.e. non discard-eligible, part of the CIR profile), yellow (i.e. discard eligible, part of the EIR profile), or red (i.e. out of profile). In many implementations (e.g., according to the MEF definitions), red frames are immediately dropped. In some schemes (e.g., the IETF assured service) three levels of discard eligibility can be marked in the frame, allowing red-color to be marked and forwarded as well).

The frame is then forwarded onto the network with a marking indicating whether it is CIR-compliant (green) or EIR-compliant (yellow). The switches in the middle of the network rely on this marking to decide whether or not to drop the frame in the event of congestion.

Several example ways to mark whether a frame is part of the CIR-conforming traffic or is part of the EIR-conforming traffic include the following. (1) In the case of ATM cells, the Cell Loss Priority (CLP) bit in the header of ATM cells may be used to indicate that the packet is discard eligible. (2) Using a flag in the frame for discard eligibility (i.e. DE flag). If this flag is set, the network drops this frame with higher probability compared to frames in which this flag is not set. Traffic confirming to the CIR is marked with this flag not set. Traffic conforming to the EIR but not to the CIR is marked with this flag set. (3) Encoding priority as well as DE in a single field, e.g., the 802.1P priority field, the MPLS experimental bits or the Differentiated Services Code Point (DSCP) field in the IP header. The IETF differentiated services assured forwarding scheme described in RFC 2597 defines three levels of discard eligibility marking. An example use of this capability is to forward non-confirming traffic in addition to the EIR and CIR traffic and to give it the highest DE priority. IEEE 802.1ad defines a standard for marking Ethernet frames with priority and discard eligibility.

The Request-Response Cycle

In practice, the NMS or network operator initiates the frame loss measurement process over a connection by instructing one of the end-points of the connection to perform the process. The end-point device then initiates measurements that are carried out periodically.

At each iteration of the process, the end-point device (i.e. the client) generates and sends a request message towards a server device. The end-point device at the remote side (i.e. the server) responds with a response message. The client side performs a statistical frame/packet loss measurement by counting the number of request messages transmitted between two specific endpoints of the connection during a specific period of time for which a response was not received. The frame loss percentage is calculated as the percentage of these unacknowledged requests from the total number of request messages transmitted between two specific endpoints of the connection during the same period of time.

The concept of a request-response cycle is well known in the art and is used by many different existing protocols for measurement of continuity, delay, jitter and frame loss. Example protocols include the mechanism described in U.S. Pat. No. 6,643,612, cited supra, the IP-ping which typically uses ICMP echo request/reply or the UDP echo port, MPLS LSP-ping (IETF RFC 4379), BFD (drafi-ietf-bfd-generic-00.txt), IEEE 802.1ag loopback request/response and ITU-T Y.1731.

In operation, the request-response cycle protocol begins with a client end-point device preparing a request message. The frame is then transmitted to the remote end-point device. Upon receiving the request message, the server side prepares and sends back a response message. Upon reception of the response message, the client (i.e. originating) end-point device performs one or more OAM calculations utilizing the content and time of arrival of the response message. OAM calculations include, for example, round-trip delay, delay-variation and statistical frame-loss calculations.

Multipoint to Multipoint Layer 2 VPNs (E-LAN, TLS, VPLS)

Transparent LAN Service (TLS), also referred to as multipoint to multipoint Layer 2 VPN (MP2MP L2VPN) and Virtual Private LAN Service (VPLS), is identified as one of the key services to be provided by an Ethernet based metro network. A TLS provides virtual Ethernet LAN (E-LAN) services. In MPLS networks, TLS implementations are referred to as VPLS. The E-LAN service (i.e. an Ethernet-service TLS) is defined by the MEF as a service that provides multipoint connectivity, i.e., it may connect two or more UNIs. Subscriber data sent from one UNI can be received at one or more of the other UNIs. In the simplest case, each site (UNI) can be set up to be a member of the same Virtual LAN (VLAN). As new UNIs (i.e. sites) are added, they can be made members of the same VLAN thus simplifying provisioning and service activation. As discussed above, implementation of an E-LAN service can be done using different technologies, including for example VPLS, TLS and Provider-Bridges according to 802.1ad.

Various techniques for providing the forwarding function in different implementations of an E-LAN service include the following:

1. Split-horizon bridging (used by VPLS) wherein each end-point is connected to each of the other components through point-to-point connections. Each end-point performs a bridging decision as to whether to forward each frame to a specific destination end-point through the point-to-point connection leading to it, or to forward the packet to all or some of the destinations (i.e. through all or some of the point-to-point connections).
2. Spanning-tree based transparent bridging wherein different nodes in the network connect through a tree of point-to-point connections and perform standard bridging between them using the connections as between them as links over which bridging is performed.
3. Link redundancy wherein a single bridging device is connected in a dual-homed way to a bridging domain using two different connections. The device chooses one of the connections to work with at any single point in time.

Note that a single E-LAN service can be constructed to have a number of domains, each implemented in one of the ways described above.

E-LAN with QoS/VPLS-TE

Virtual Private LAN Service-Traffic Engineering (VPLS-TE) TE extends VPLS to include support for traffic engineering and hard QoS, in similar fashion as OSPF-TE extends OSPF for traffic engineering and QoS. VPLS-TE is based on the standard VPLS implementation with bandwidth reservation extensions (rather than additional protocol items) that provide additional element functionality resulting in bandwidth reservation and guarantee for E-LAN services. VPLS-TE attempts to correctly define the bandwidth characteristics of an E-LAN service and model it correctly. Anther example of E-LAN with hard QoS can be devised by adding TE capabilities to 802.1ad provider-bridges.

Two models are currently proposed and discussed in standardization bodies such as the MEF. The first is the "pipe" model while the second is the "hose" model. According to the pipe model, bandwidth is specified between each pair of sites of an E-LAN service. The bandwidth setting corresponds to a logical mesh between all the E-LAN sites. An E-LAN service of N sites thus requires $N \times (N-1)$ bandwidth settings to be associated with the service.

The "pipe" model has several drawbacks including scalability and applicability.

1. Scalability: It is impractical to define such a large number of bandwidth reservations for an E-LAN service with a large number of sites. For example, an E-LAN service with 10 sites requires 90 settings of bandwidth to be associated with the sites mesh. In addition, since traffic coming into the network needs to be conditioned, this model requires also N×(N−1) policers throughout the various PE devices participating in a single VPLS instance conforming to an E-LAN service.

2. Applicability: In many cases, the traffic pattern between the different sites is not known. A network administrator of a corporate network seeking to subscribe to an E-LAN service, is likely to know how much bandwidth is needed in each of the corporate sites. Often, however, he may have no idea how that bandwidth diverges from a specific site towards other ones. In addition, occasionally he may want to be able to use most of the bandwidth to send traffic from a specific branch office to a headquarters site, while during the night use the same bandwidth associated with the branch office to perform a backup with the servers of the corporate network located at another site.

According to the "hose" model, ingress bandwidth is specified for each site, regardless of where traffic is actually going. An E-LAN service can be represented as a cloud, where each site can inject a certain amount of bandwidth into the cloud, and receive a certain amount of bandwidth from the cloud.

Figure 2:
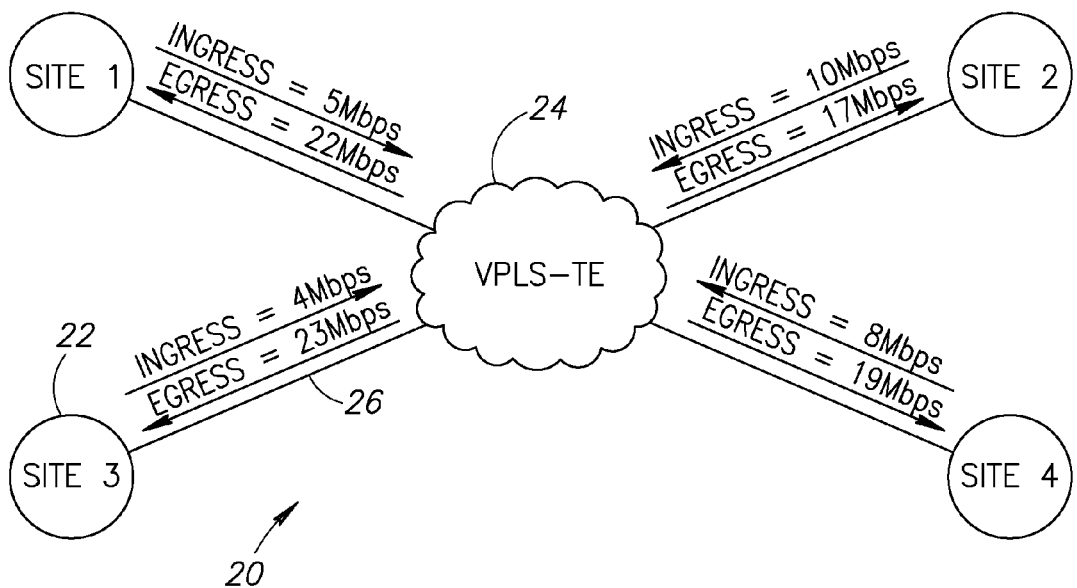
FIG. 2 is a block diagram illustrating a first variation of the hose model of bandwidth definition of an E-LAN service.

The hose model has an advantage, due to its higher scalability as well as its ease of configuration and specification. The hose model comprises two variations:

1. Ingress specified bandwidth: Each site specifies its ingress bandwidth profile towards the E-LAN cloud. The egress bandwidth of each site is logically derived as the sum of the ingress bandwidth of all other sites. This is because at a certain point in time all other sites may be sending their guaranteed bandwidth towards the same site. A single policer/shaper is needed at each site entry into the network in order to condition the traffic from that site. A block diagram illustrating this first variation of the hose model of bandwidth definition of an E-LAN service is shown in FIG. 2. The network, generally referenced 20, comprises a plurality of customer sites 22, VPLS-TE cloud 24 and links 26. The ingress and egress bandwidths are specified on the respective arrows for each link.

Figure 3:
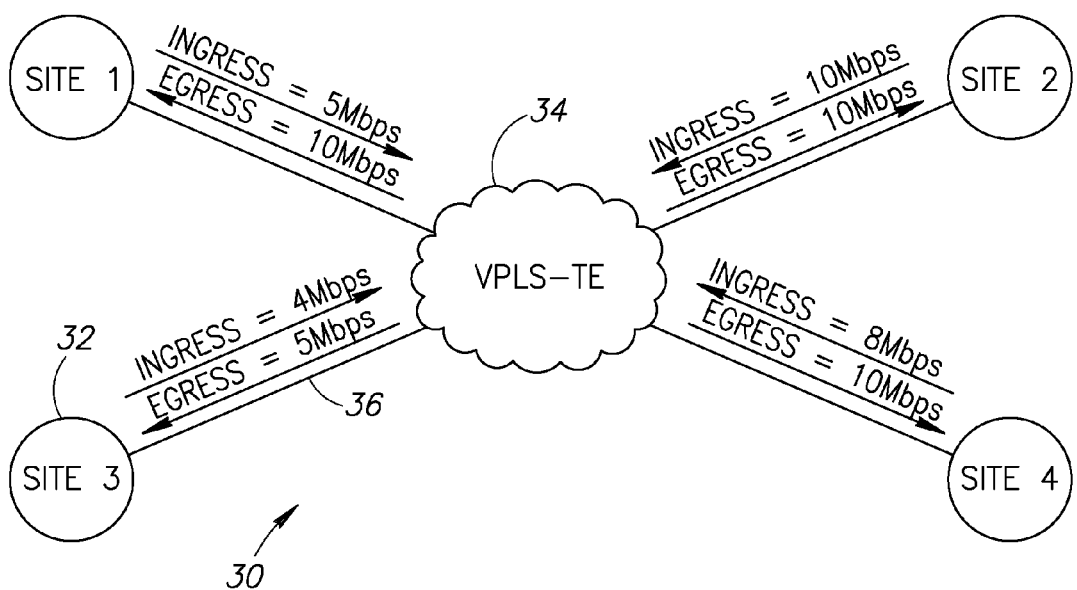
FIG. 3 is a block diagram illustrating a second variation of the hose model of bandwidth definition of an E-LAN service.

2. Bidirectional specified bandwidth: Each site is specified with its ingress bandwidth and egress bandwidth from the network for that E-LAN service. As a result, bandwidth reserved inside the network for each site need not necessarily be the sum of the bandwidth of all other sites. This approach allows the carrier to offer hard QoS E-LAN service, while requiring significantly less network resources. A block diagram illustrating this second variation of the hose model of bandwidth definition of an E-LAN service is shown in FIG. 3. The network, generally referenced 30, comprises a plurality of customer sites 32, VPLS-TE cloud 34 and links 36. The ingress and egress bandwidths are specified on the respective arrows for each link.

Policing of Traffic Inside the Network

The implementation of layer 2 VPNs includes policing or shaping at the ingress of the network. Additional policing at the middle of the network would be beneficial in the following two example cases. The first in which implementation of the hose model with bidirectional bandwidth specification requires policing at the layer-2 switching instances inside the network. The second at the border between two networks of different service-providers wherein a network receiving traffic from another provider network may need to police and/or shape the received traffic according to the contract between the two providers, etc.

Request-Response Based OAM Protocol Operation Over L2VPNs (E-LANs)

This section describes a mechanism to support request-response protocols operation between pairs of selected sites. The operator selects two specific end-points of an E-LAN, E-Line, or other service and the measurement scheme measures the frame loss between them and, optionally, may also provide other measurements like delay, jitter, availability, etc.

Measurements between two specific sites are possible since the protocol comprises means for informing the TLS fast-forwarding engines (any layer-2 forwarding component depending on the specific technology) where to forward the frames containing its messages, so that each of the two sites can send protocol messages to each other.

With an E-LAN service, the destination MAC address of the frame is set to a MAC address learned to be at or behind the target end-point. In this way, the OAM frame is steered just like any other frame, according to its destination MAC address.

Thus, the request-response protocol frames comprise the source and destination MAC addresses identifying the two endpoints between which the measurements are to be made. The preferred implementation is to use the layer-2 header source and destination MAC addresses. In some cases, however, these fields may be placed in a different part of the frame.

Statistical Frame Loss Measurements Using a Request-Response Protocol

The invention provides support for statistical frame loss measurements. In one embodiment, two counters per connection are added and a pair of end-point addresses monitored by the client device:

1. One counter is operative to count the number of measurement cycles in which the connection and address pair were monitored. This number is identical to the number of request-messages that were sent.

2. A second counter is operative to count the number of measurement cycles in which the connection and address pair were monitored by this iteration and a response was not received.

Provider Switch Embodiment

A network device can be adapted to incorporate the policy aware frame loss measurement mechanism of the present invention. Hardware means and/or software means adapted to execute the mechanism may be incorporated, for example, within the line cards of a network device such as a core switch, access switch, provider switch, enterprise switch, Network Management System (NMS), Label Switching Router (LSR), Ethernet LAN switch, network switch or any other wired or wireless network device. The network device may be constructed using any combination of hardware and/or software. A provider switch is defined as any switch used by a service provider. Examples of provider switches include edge switches, core switches and access switches. An enterprise switch is defined as any switch used within an enterprise, such as the switches used within a corporation, college campus, etc.

Figure 4:
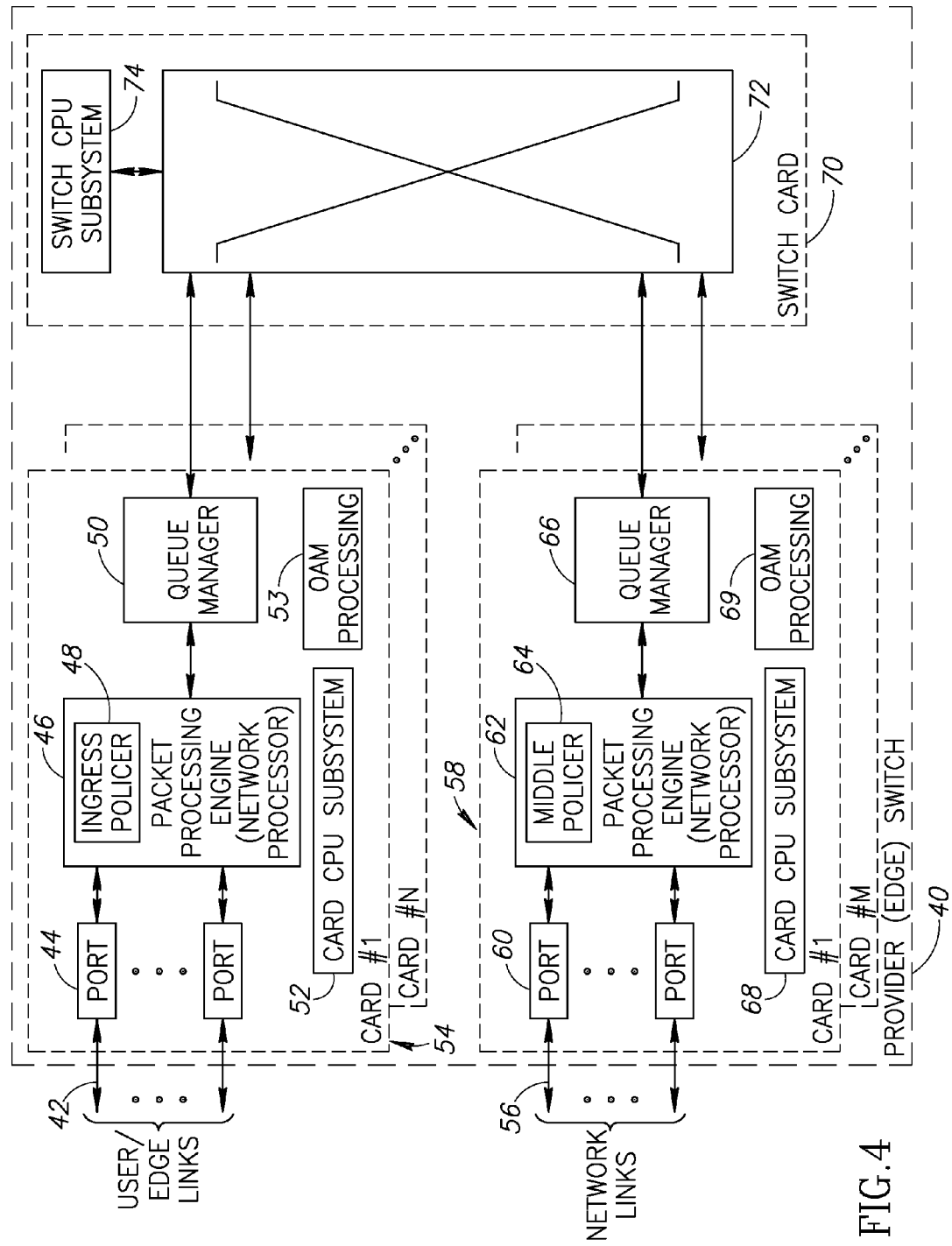
FIG. 4 is a block diagram illustrating an example provider edge/provider core switch incorporating the ingress and middle policer mechanisms of the present invention.
Figure 5:
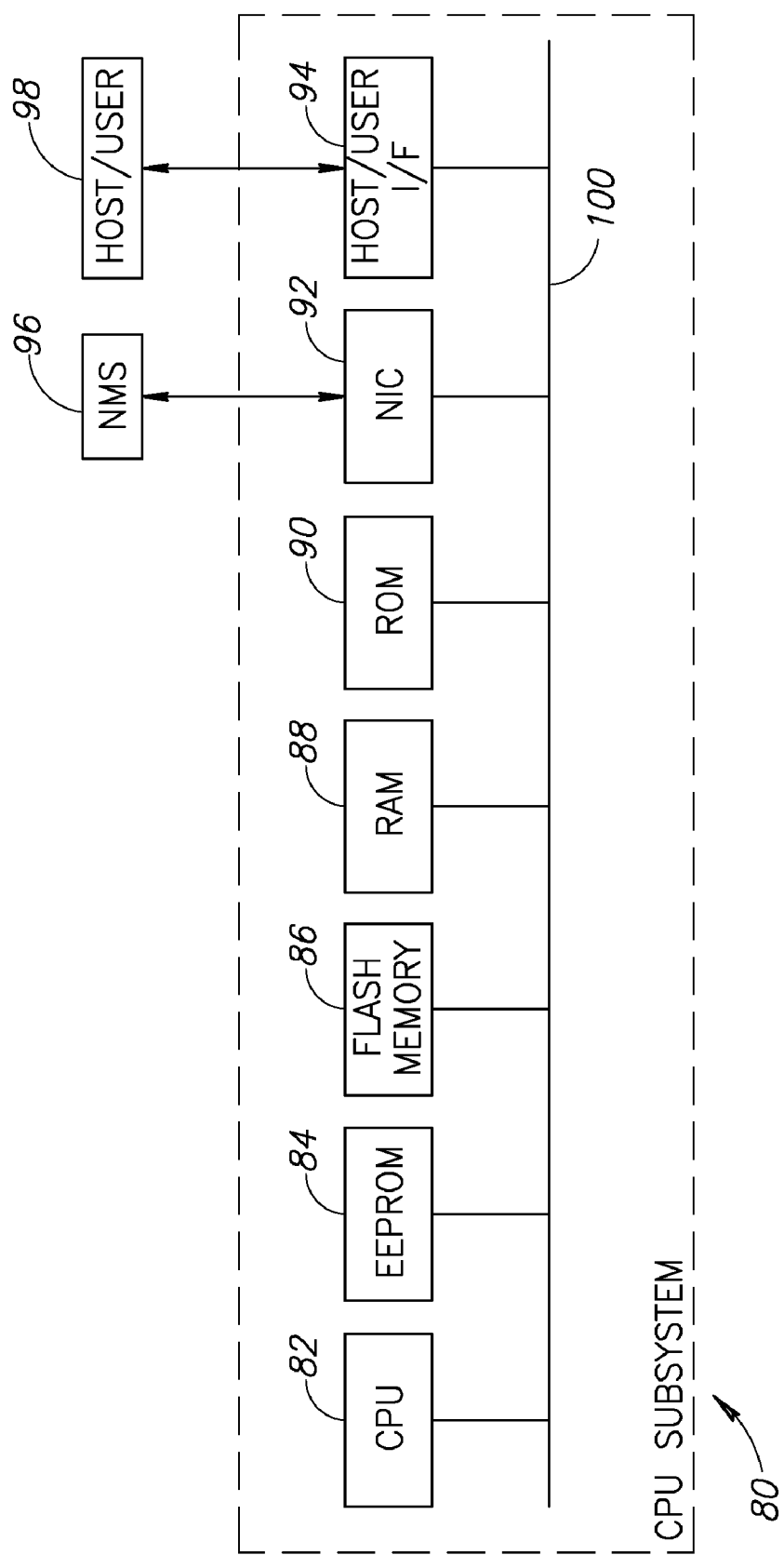
FIG. 5 is a block diagram illustrating the CPU subsystems of the provider edge/provider core switch of FIG. 4 in more detail.

As an example, the invention is applied to a provider edge switch and a provider (core or middle) switch. A block diagram illustrating an example provider edge or provider core (middle) switch incorporating the client OAM processing and policer mechanisms of the present invention is shown in FIG. 5. A block diagram illustrating the CPU subsystems of the provider edge/provider core switch of FIG. 4 in more detail is shown in FIG. 5. With reference to FIGS. 4 and 5, the provider switch, generally referenced 40, is modularly constructed and comprises a plurality of provider edge line interface cards 54, labeled card #1 through card #N, plurality of provider core line interface cards 58, labeled card #1 through card #M and one or more switch cards 70. Each card 54 comprises a plurality of ports 44, packet processing engine (PPE) 46, queue manager 50, card CPU subsystem 52 and OAM processing module 53. Each card 58 comprises a plurality of ports 60, PPE 62, queue manager 66, card CPU subsystem 68 and OAM processing module 69. The line cards 54 function to provide an interface to users/edge devices communication links 42. The line cards 58 function to provide an interface to network communication links 56. The switch card provides a switching function whereby packets are transferred between line cards (or between ports).

This section describes a mechanism to support request-response protocol operation between pairs of selected sites. The operator selects two specific end-points of an E-LAN, E-Line, or other service and the measurement scheme measures the frame loss between them and, optionally, may also provide other measurements such as delay, jitter, availability, etc.

Similarly, the OAM processing module 53 (which performs the client/server operation and statistics gathering), optionally also the OAM processing module 69, in combination with the network processor 62, implements the middle network based policy aware frame loss measurement mechanism of the present invention. Note that the functionality of the OAM processing block 62 can be implemented in software (as shown), in hardware or a combination of software and hardware depending on the particular implementation.

The communication links 42 are terminated at the line cards via the plurality of ports 44. The communication links 56 are terminated at the line cards via the plurality of ports 60. Regardless of what type of links they are connected to, the ports function to provide the PHY interface to the bidirectional communication links. The line interface cards may be adapted to interface to any particular type of link including, for example, any variety of copper or optical based Ethernet, Token Ring, FDDI, SONET/SDH, ATM, RPR. In addition, a line card may have a plurality of ports each adapted to communicate over a different type of link. For connecting to a user or edge device, the port is adapted to connect directly or indirectly through access/aggregation devices to a plurality of users or customer/client edge devices via communication links 42. The client edge ports of the provider switch interface to the user or client edge device via any suitable type of interface, e.g., Gigabit Ethernet (GE), Fast Ethernet (FE), PDH interface (e.g., T1/E1), etc. Similarly, if the port connects to a network link 56, the port functions to interface the line card to other provider switches (i.e. edge or core switches) via any suitable interface such as Optical Ethernet (e.g., 1 GE, 10 GE, etc.), TDM, RPR, etc.

Data received over the links 42 by the ports is forwarded to the packet processing engine (PPE) or network processor 46. Data received over the links 56 by the ports is forwarded to the packet processing engine (PPE) or network processor 62. The packet processing engines 46, 62 perform packet processing on the packets received from the ports. Some of the key functions performed by the packet processing engine include determining the discard eligibility of each packet, calculating a forwarding decision for each packet, determining which queue to forward the packet to and making any necessary changes to a packet.

The packet processing engines 46, 62 comprise both an ingress packet processor (not shown) and an egress packet processor (not shown). The packet processing engine typically also comprises timestamp circuits, clock circuits, memory, counters and CPU interface, means for performing OA&M protocols processing (part of this capability may reside in the CPU as well). The PPE 46 comprises the ingress policer 48 intended to be located in a provider edge switch and which is operative to make marking decisions based on the contents of the received packet and the current traffic conditions. The PPE 62 comprises the middle policer 64 intended to be located in a provider (middle) switch and which is operative to make marking decisions based on the contents of the received packets and the current traffic conditions.

The packet processing engine may be implemented as a microcontroller, microprocessor, microcomputer, ASIC core, FPGA core, network processor, central processing unit (CPU) or digital signal processor (DSP) or any other suitable computing means. Once processing is complete, the packet processing engine passes packets to the queue manager which functions to place the packet in the appropriate ingress queue.

The queue managers functions to manage the various queues within the line card. A plurality of queues are typically used wherein separate queues are provided for different priorities, destinations, etc. Note that the invention is not limited to any particular line interface type or link speed. In addition, the invention is not limited to any particular number of communication links or ports, as any number of links and ports of each type may be used. Further, the line interface cards may be adapted to interface to any type of communication links such as any variety of copper or optical based Ethernet, Token Ring, FDDI, SONET/SDH, PDH, ATM, RPR, etc. Note that the queue management system is typically constructed in hardware in order to provide a high bandwidth fast path for data that is capable of keeping up with the line rates of the communication links.

Note that the specific implementation of the line card is not critical to the invention. For example, a single packet processing engine may be adapted to handle a plurality of ports or a plurality of packet processing engines may be used, one for each port. Similarly, a single queue manager per line card may be used or a plurality of queue managers may be used, one for each packet processing engine (in the case multiple packet processing engines are realized). Further, the switch CPU subsystem may be incorporated on the same card as the switching matrix or may be realized on a separated card in the chassis.

As an example, the invention is applied to a provider edge switch and a provider core or middle switch. A block diagram illustrating an example provider edge or provider core (middle) switch incorporating the client OAM processing and policer mechanisms of the present invention is shown in FIG. 4. A block diagram illustrating the CPU subsystems of the provider edge/provider core switch of FIG. 4 in more detail is shown in FIG. 5. With reference to FIGS. 4 and 5, the provider switch, generally referenced 40, is modularly constructed and comprises a plurality of provider edge line interface cards 54, labeled card #1 through card #N, plurality of provider core line interface cards 58, labeled card #1 through card #M and one or more switch cards 70. Each card 54 comprises a plurality of ports 44, packet processing engine (PPE) 46, queue manager 50, card CPU subsystem 52 and OAM processing module 53. Each card 58 comprises a plurality of ports 60, PPE 62, queue manager 66, card CPU subsystem 68 and OAM processing module 69. The line cards 54 function to provide an interface to users/edge devices communication links 42. The line cards 58 function to provide an interface to network communication links 56. The switch card provides a switching function whereby packets are transferred between line cards (or between ports).

The central processor 82 implements the major functionality of the control and management planes of the line card including higher software layer processing. Note that the central processor may be implemented in any suitable form such as a microcontroller, microprocessor, microcomputer, ASIC core, FPGA core, central processing unit (CPU) or digital signal processor (DSP) or any other computing means.

The CPU subsystem also comprises a NIC 92 for providing an out of band interface for connecting to external entities such as a craft for local maintenance and configuration purposes, an NMS 96 for centralized provisioning, administration and control or a Local Area Network (LAN). The CPU subsystem switch may comprise additional interfaces, such as a serial interface for connecting to a PC for configuration purposes. Note that these interfaces are typically part of the CPU subsystem that manages the chassis.

The network device also comprises an optional user interface 94 adapted to respond to user/operator inputs and commands and to provide feedback and other status information. A host/user interface 94 enables communication with a user or host-computing device 98. The host may be adapted to configure, control and maintain the operation of the provider switch. Note that these interfaces are typically part of the CPU subsystem that manages the chassis.

In the ingress direction, data output from the queues on each of the line cards is forwarded to the switching matrix. The switch matrix implements the switching fabric (switching matrix block 72) for providing the switching functionality of the provider switch. A switch CPU subsystem 74 (described supra) provides a centralized processing function for the switch matrix. The switch CPU subsystem may also serve as the central CPU for the chassis, optionally residing on a separate card and managing chassis resources such as fans and power, as well as providing a single point of management for the entire chassis, i.e., representing the other cards to the user or craft. The switch CPU subsystem may comprise the CPU subsystem shown in FIG. 5 and described hereinabove. Note that depending on the specific implementation, the switching matrix may comprise, for example, hardware for performing VLAN tagging, MPLS, Frame Relay, ATM switching, CSIX, OIF-SPI.4, or any other switch matrix to network interface protocol.

In the egress direction, the switch matrix forwards the traffic towards the egress port, through the egress queue.

A plurality of provider switches may be connected to each other using any topology. The switches may support any kind of a switching technology, including MAC-based switching, VLAN-based switching, MPLS, ATM, etc. Alternatively, the network may comprise only provider edge switches whereby a plurality of provider edge switches are connected in a ring topology.

The queue managers function to manage the various queues within the line card. A plurality of queues are typically used wherein separate queues are provided for different priorities, destinations, etc. Note that the invention is not limited to any particular line interface type or link speed. In addition, the invention is not limited to any particular number of communication links or ports, as any number of links and ports of each type may be used. Further, the line interface cards may be adapted to interface to any type of communication links such as any variety of copper or optical based Ethernet, Token Ring, FDDI, SONET/SDH, PDH, ATM, RPR, etc. Note that the queue management system is typically constructed in hardware in order to provide a high bandwidth fast path for data that is capable of keeping up with the line rates of the communication links.

Note that the specific implementation of the line card is not critical to the invention. For example, a single packet processing engine may be adapted to handle a plurality of ports or a plurality of packet processing engines may be used, one for each port. Similarly, a single queue manager per line card may be used or a plurality of queue managers may be used, one for each packet processing engine (in the case multiple packet processing engines are realized). Further, the switch CPU subsystem may be incorporated on the same card as the switching matrix or may be realized on a separate card in the chassis.

SLA Measurement Frame Formats

Figure 6:
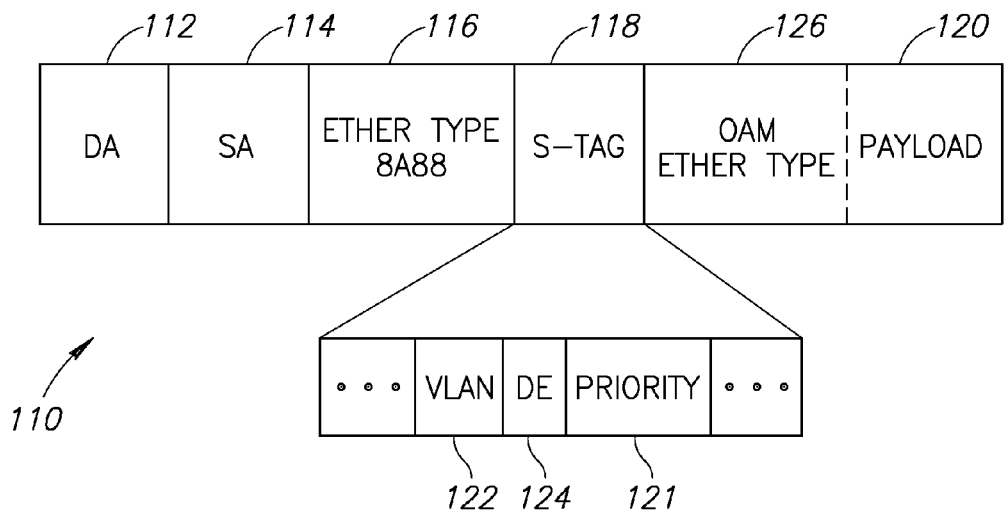
FIG. 6 is a diagram illustrating the frame format of an IEEE 802.1ad provider-tagged frame.
Figure 7:
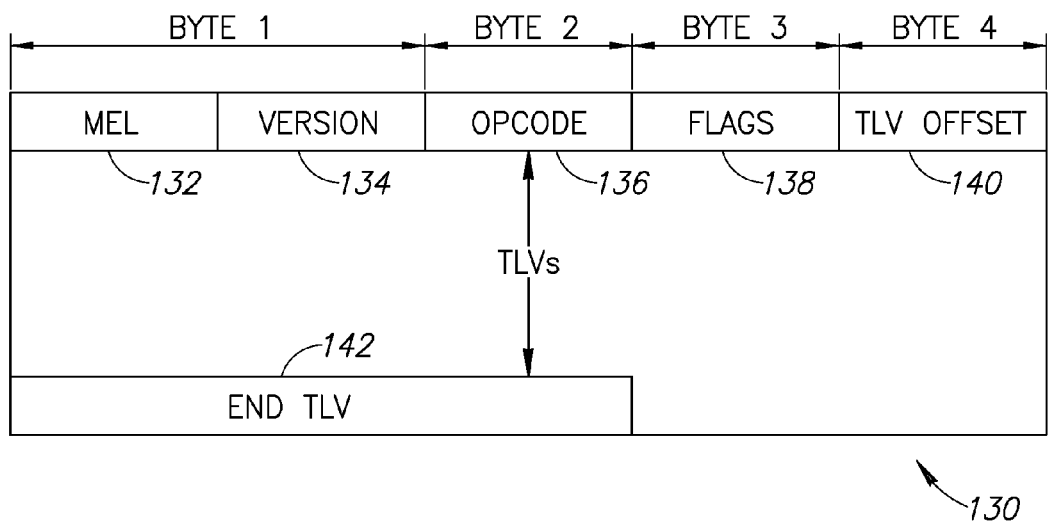
FIG. 7 is a diagram illustrating the frame format of an OAM PDU for IEEE 802.1ag/ITU-T 1731 messages incorporating a plurality of fields in accordance with the present invention.

The frame formats for the OAM frame loss measurement mechanism are provided in FIGS. 7, 8 and 9. The frame formats are based on the IEEE-802.1ad and 802.1ag/ITU-T Y.1731 standards, with extensions added for implementing the mechanism of the present invention. A diagram illustrating the frame format of an IEEE 802.1ad provider-tagged frame is shown in FIG. 6. The frame format, generally referenced 110, is used for forwarding traffic with DE marking, and comprises the following fields: destination MAC (DA) address 112, source MAC (SA) address 114, Ether type 8A88 116, S-TAG 118 and payload 120. The S-TAG format comprises a VLAN Identifier (VID) field 122, discard eligibility field 124 and a priority field 121. The payload typically holds the client traffic provided by the service. In case the frame is an IEEE 802.1ag/ITU-T Y.1731 frame, the payload starts with an OAM Ether Type 126 telling that the rest of the payload is an OAM message according to these standards.

An example for a request-response protocol for monitoring Ethernet services is the ETH-LB (Ethernet loopback) procedure of the IEEE 802.1ag/ITU1731 Ethernet-Service OAM standards. A diagram illustrating the frame format of an OAM PDU for IEEE 802.1ag/ITU1731 messages incorporating a plurality of fields in accordance with the present invention is shown in FIG. 7. This PDU, generally referenced 130, is encapsulated in the payload portion of the IEEE 802.1ad frames shown in FIG. 6. The frame format for a request-response protocol comprises a maintenance entity group level (MEL) field 132, version 134, OpCode 136, flags field 138, TLV offset 140 and End TLV 142.

The following objects are required for implementing the middle network policy aware frame loss measurement mechanism of the invention. Some are implemented as flags sent in the flags field 138 of FIG. 7. Others are sent in one or more TLVs as described infra. A diagram illustrating the flags field of the frame of FIG. 7 in more detail is shown in FIG. 8.

The following flags are required for the implementation of the invention and are preferably placed in the flags field 138 of the SLA-measurements protocol/IEEE-802.1ag/ITU1731 frame 130. Alternatively, a TLV can be defined and added to the frame that holds these flags.

1. Policer-decision-to-remark-request (150): set to 1 if a policer decides to mark the request frame as discard eligible.
2. Policer-decision-to-drop-request (152): set to 1 if a policer decides to drop the request frame.

3. Policer-decision-to-remark-response (154): set to 1 if a policer decides to mark the response frame as discard-eligible.
4. Policer-decision-to-drop-response (156): set to 1 if a policer decides to drop the response frame.
5. Was-marked-as-DE (158): set to 1 if the last decision on this frame was to mark it as DE.
6. OAM-frames-remark (160): indicates how to forward a measurement protocol frame that was supposed to be remarked.

A diagram illustrating the frame format of a TLV frame as provided in accordance with the present invention is shown in FIG. 9. The TLV frame, generally referenced 170, comprises a type field, length field 174 and two fields 176, 178. The two fields 176, 178 supply more fine-grained information about which policers made decisions regarding a specific frame. These fields comprise:

1. Request processing information (176): comprises information about policer decisions while forwarding the request message.
2. Response processing information (178): comprises information about policer decisions while forwarding the response message.

Each of these two fields themselves comprises three identical sub-fields as follows:

1. Number-of-middle-policers-passed (180): This field holds the number of policers that already processed this frame.
2. Remark-deciding-policer-index (182): This field is valid only if the relevant (i.e. request/response) 'Policer-decision-to-remark' flag is set. It should be set to the index (within the list of policers that processed the frame) of the policer that decided to remark the frame as discard eligible. The index of the ingress policer is zero.
3. Drop-deciding-policer-index (184): This field is valid only if the relevant (i.e. request/response) 'Policer-decision-to-drop' flag is set. It should be set to the index (within the list of policers that processed the frame) of the policer that decided to drop the frame. The index of the ingress policer is zero.

Ingress OEM Client Policy Aware Statistical Frame Loss Measurement Method #1

There are two different modes of operation when performing statistical frame loss measurements for connections. One is a mode in which only the loss of CIR traffic is measured and the second is a mode in which the frame loss for all traffic (i.e. CIR and EIR compliant) is measured. The invention provides two methods for implementing the second mode as described infra.

Figure 10:
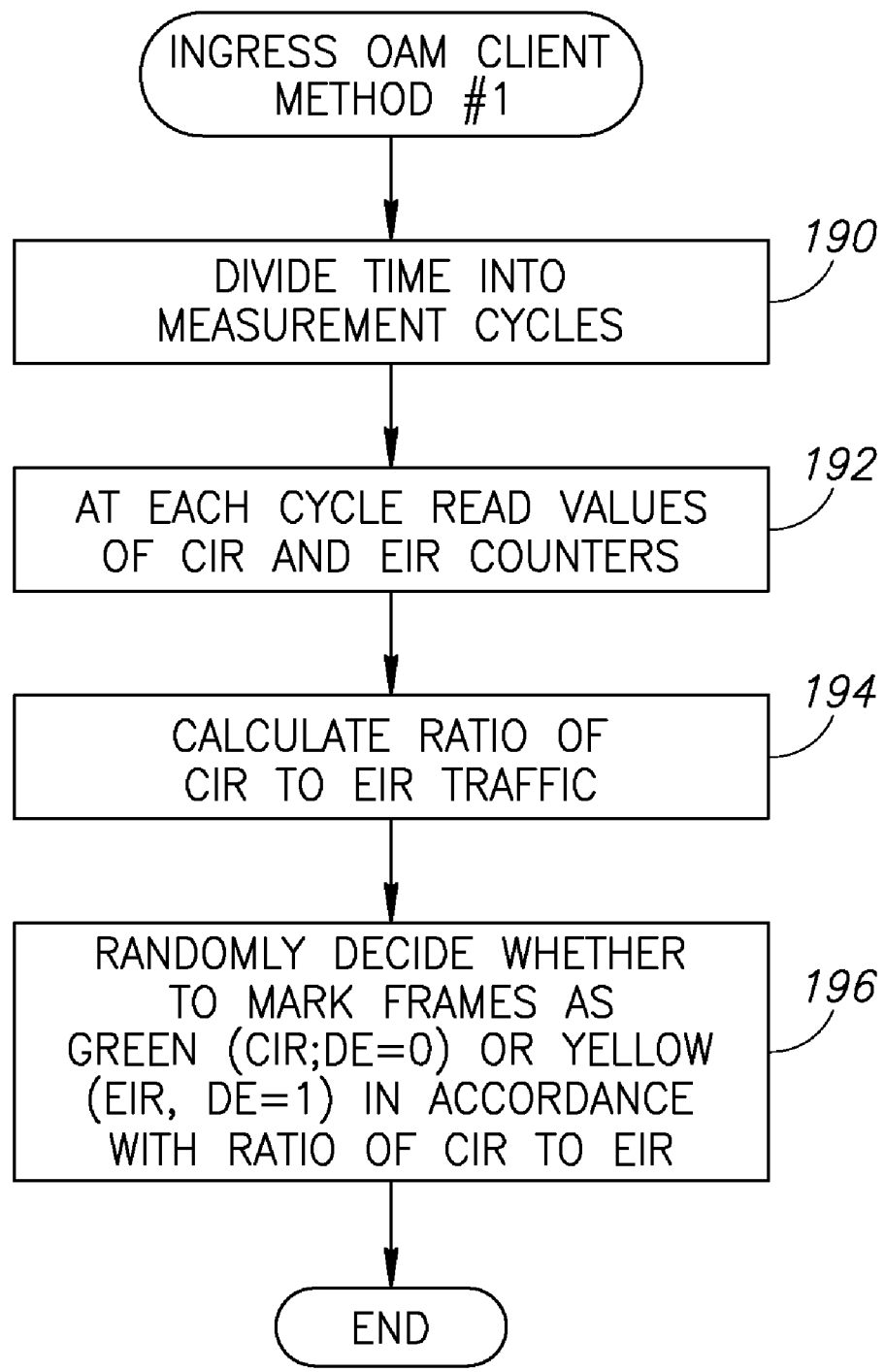
FIG. 10 is a flow diagram illustrating a first ingress OAM client method in accordance with the present invention.

A flow diagram illustrating a first ingress OAM client method in accordance with the present invention is shown in FIG. 10. The first implementation of the second mode (in which frame loss measurements are for CIR and EIR traffic) comprises first dividing time into periodic measurement cycles (step 190). At each cycle time, the values of the CIR and EIR counters are read (192). Note that counters are read by the network device using software, hardware or a combination of the two. The ratio of CIR to EIR traffic forwarded at the ingress of the connection at the client side during the last cycle is then calculated (step 194).

The method then makes a random decision whether to mark the request-response protocol frames as green (i.e. CIR, DE set to 0) or yellow (i.e. EIR, DE set to 1) (step 196). Note that the marking decision is made according to the ratio between the EIR and CIR counters during the last iteration. The last iteration refers to the time interval starting at the former time this connection was measured and ending at the time it is measured again. If no traffic was sent during the last iteration, the protocol frames should be marked as CIR. Optionally, frame loss is not measured if there was no user traffic during the last iteration.

Ingress OEM Client Policy Aware Statistical Frame Loss Measurement Method #2

Figure 11:
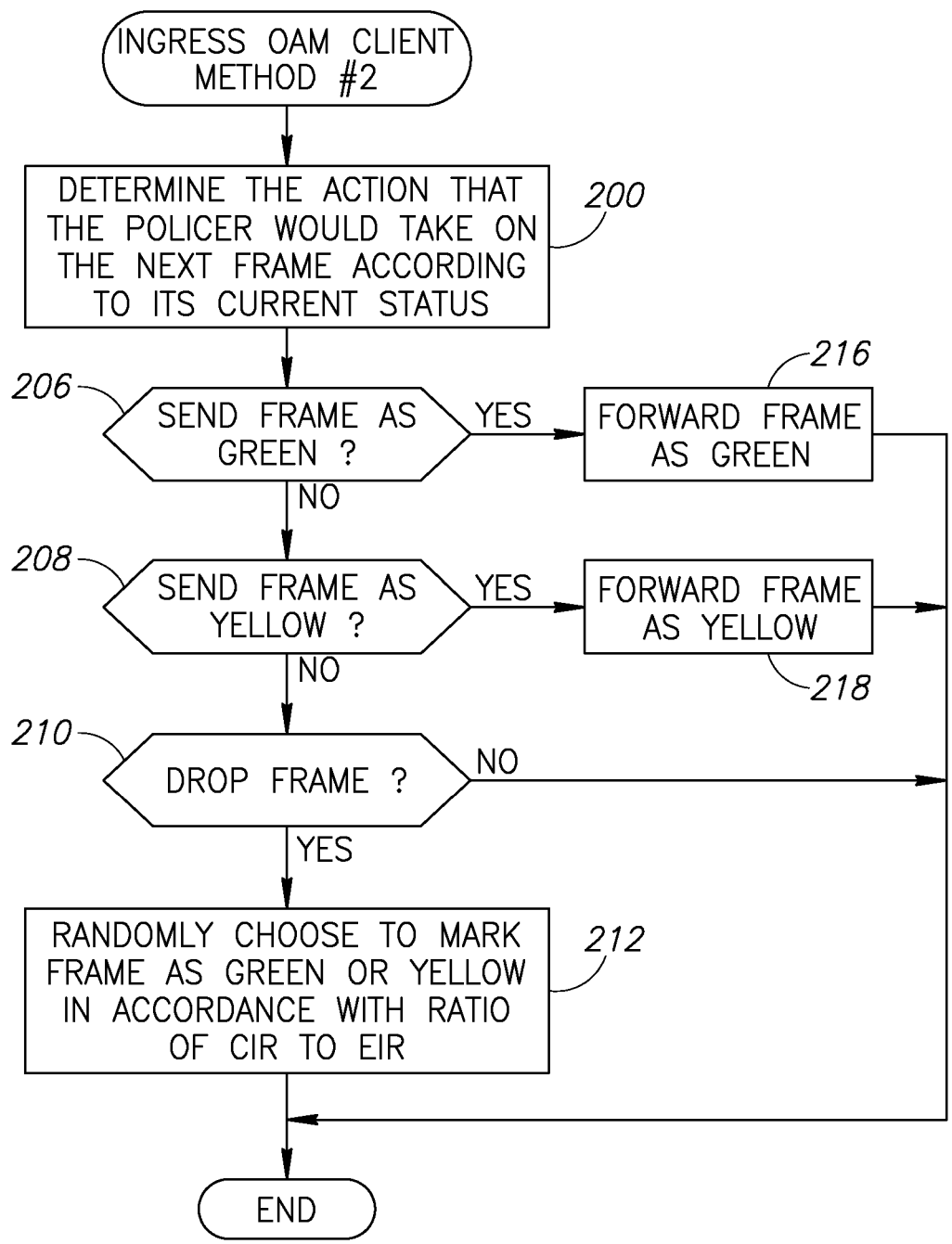
FIG. 11 is a flow diagram illustrating a second OAM client method in accordance with the present invention.
Figure 12:
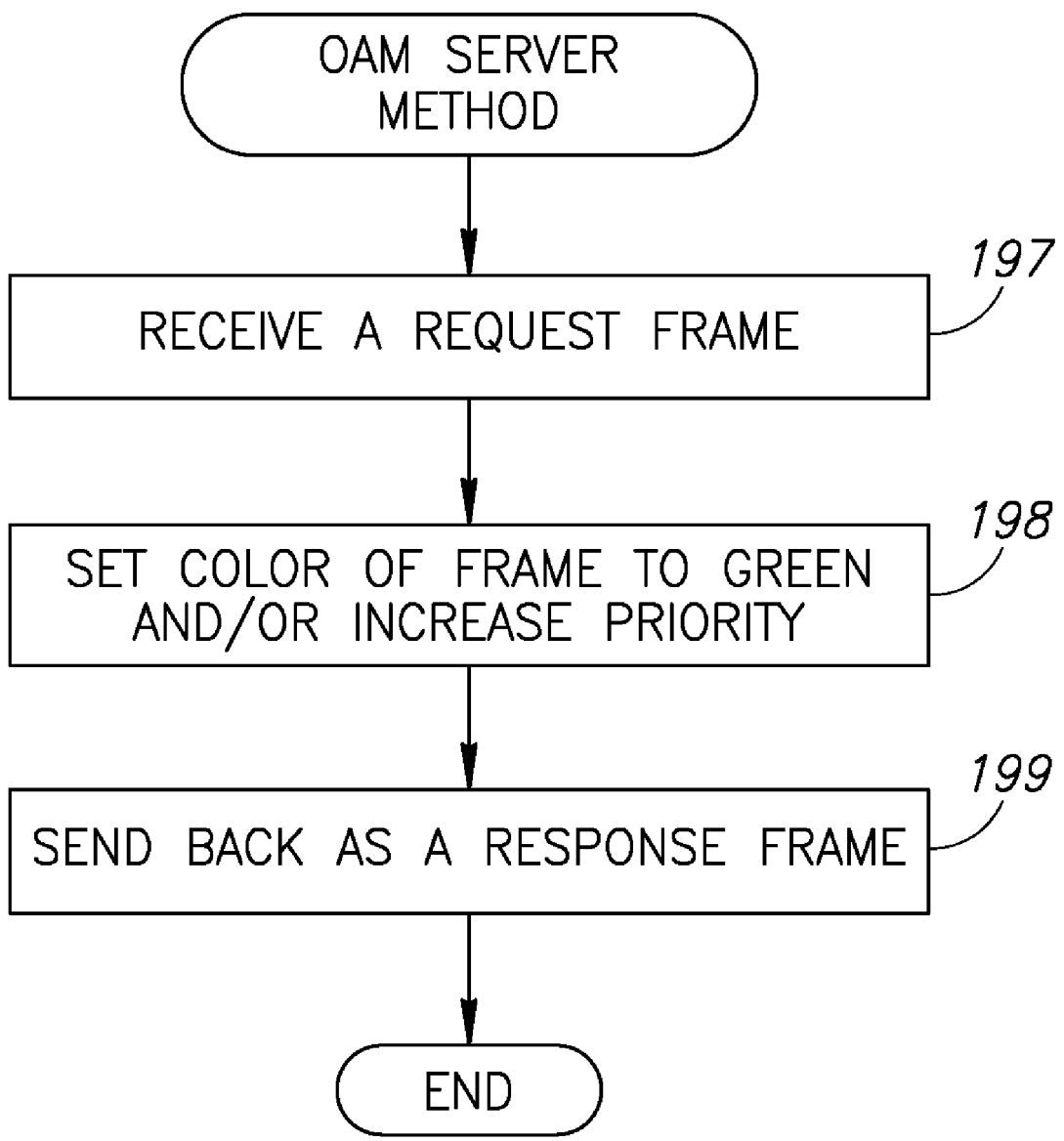
FIG. 12 is a flow diagram illustrating a sever method in accordance with the present invention.

A flow diagram illustrating a second OAM client policer method in accordance with the present invention is shown in FIG. 11. A second implementation of the second mode (measurement of CIR and EIR loss) comprises reading the status of the policer of the connection before sending the OAM protocol frame and taking into account the policer potential decision, as reflected by the read status, deciding how to mark the frame (if given to it). With reference to FIG. 12, the method first determines a potential action (i.e. decision) that the policer would have taken on a frame having the same length as that of the OAM protocol frame to be injected into the connection, without actually taking any action (step 200). The action taken next depends on this calculated potential action (decision).

If the calculated potential decision is to send the frame as green (i.e. an unmarked frame belonging to the CIR) (step 206), then the frame is forwarded with as green (i.e. DE=0 or not marked as DE) (step 216). If the calculated potential decision is to send the frame as yellow (i.e. a marked frame, DE=1) (step 208), the frame is forwarded as yellow (i.e. DE=1 or marked as DE) (step 218).

If the calculated potential decision of the policer was to drop the frame (step 210), then the software or other OAM processing entity randomly marks the frame as green (DE=0) or yellow (DE=1) in accordance with the ratio of CIR to EIR configured to the policer. More specifically, the frame is marked as yellow (DE=1) with a probability of EIR/(CIR+EIR), wherein CIR and EIR values are in accordance with the configuration of the connection at the specific UNI port and defined according to the MEF traffic parameters definitions (step 212). Accordingly, the frame is forwarded unmarked (DE=0) with a probability of CIR/(CIR+EIR).

Note that in the CIR-only marking mode, the frame loss measurement is a roundtrip measurement, meaning that the frame loss count is increased if either the request or the response of a specific iteration was dropped. In the CIR+EIR marking mode, the marking of the protocol frames as CIR or EIR is in accordance with the behavior of the traffic in the client-to-server direction. Therefore, in case of CIR and EIR measurements, the invention provides a mechanism to ensure that the protocol frame only measures the frame loss in the client to server direction and not roundtrip. This is achieved using the method described below.

A flow diagram illustrating an ingress OAM sever method in accordance with the present invention is shown in FIG. 12. When request frames arrive at the server end of the connection (step 197), all respective response frames are sent marked as CIR (i.e. green) regardless of the marking of the request frames and/or are given a higher priority such that they are not dropped in the event there is congestion in the network along the return path (step 198). The frames are changed to CIR regardless of their current state. The frames are then sent back as a response frame (step 199).

Alternatively, a one-way measurement protocol is used instead of a request-response protocol. With a one-way protocol, The number of OA&M frames transmitted between the transmitter and the receiver is coordinated such that frame loss can be measured. An example coordination technique is to use a running-counter based message identification or to agree a priori on the exact timing of message transmission.

Middle Policy Aware Statistical Frame Loss Measurement Method

The mechanism of the present invention also provides a method of statistical frame loss measurement that is operative to inform the client of the policy-related actions taken inside in the middle of the network. As described above, the VPLS-TE (i.e. hard-SLA TLS), or any other technology with hard-SLA additions, applies SLA policy in the middle of the network the result of which may result in frames being remarked or dropped. This is achieved by re-policing the traffic using color aware policers. Color-aware policers are policers that (1) police frames which may have already passed through a policer and (2) take the marking (i.e. color) of the frame into account when deciding on a new marking. Policing in the middle of the network may also take place in inter-metro cases, in which frames may be remarked or dropped at the NNI.

The middle policy aware frame loss measurement method is operative to provide additional information to the operator about the reason for any frame loss inside the network. Specifically, it provides information to the operator regarding what portion of the frame loss is due to congestion; bad links etc. versus the portion of frame loss due to the SLA policy.

Specifically, the TLS/VPLS-TE/E-LAN implementation example provided herein utilizes policers at the L2SWIs (Layer-2 Switching Instances) which may remark and even drop frames which passed the ingress policers at the ingress UNI. If these policers are permitted to drop or remark request-response OAM protocol frames in similar fashion as for user data frames, it would be impossible for the operator to know that the measured frame loss is actually 'justified' and a result of his own SLA policy. On the other hand, if the middle policers are not permitted to drop or remark request-response protocol frames, the result would not reflect the actual frame loss of user-data.

Therefore, in accordance with the invention, a plurality of flags are defined in the flags field 138 (FIGS. 7 and 8) of the SLA measurement protocol frame, as described supra. in summary, these flags comprise: a policer-decision-to-remark-request flag 150, policer-decision-to-drop-request flag 152, policer-decision-to-remark-response flag 154 and a policer-decision-to-drop-response flag 156. With reference to FIG. 9, two additional fields supply more fine grained information about which policers made decisions regarding the specific frame. These fields comprise a request processing information field 176 and a response processing information 178. Each of these two subfields itself comprises three subfields: number-of-middle-policers-passed field 180, remark-deciding-policer-index field 182 and drop-deciding-policer-index 184.

Figure 13:
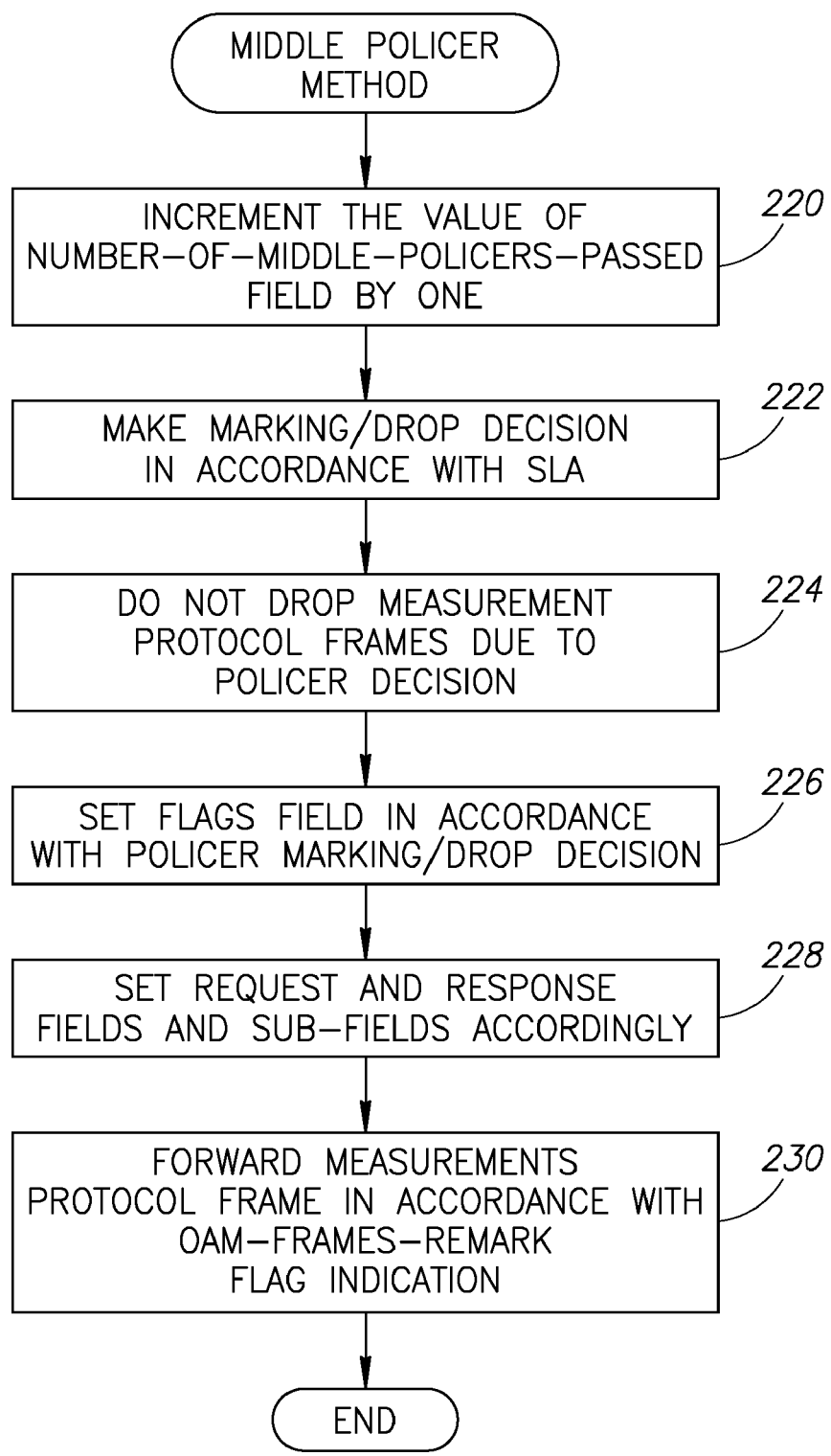
FIG. 13 is a flow diagram illustrating a middle policer method in accordance with the present invention.

A flow diagram illustrating a middle policer method in accordance with the present invention is shown in FIG. 13. The following processing is required at the middle-policers for frame-loss measurement protocol messages. The method presented is generalized and can be applied numerous systems and networks. The method refers to the request or response flags and processing information fields, depending on whether the processed message is a request or a response message.

First, the value of the number-of-middle-policers-passed field is incremented by one (step 220). The middle policer then makes a decision to mark or drop the frame in accordance with the SLA policy (step 222). Regardless of the decision of the middle policer, the SLA measurement protocol frames are not dropped (step 224). The individual flags in the flags field are then set or cleared according to the policer mark/drop decision as described below (step 226). Note that the logic defined below is applicable to both request and response frames accordingly.

If decision of the middle policer was to change the marking of the frame and the policer-decision-to-remark flag is not set, then the policer-decision-to-remark flag is set and the remark-deciding-policer-index is set according to the number-of-middle-policers-passed. If the decision of the middle policer was to drop the frame and the policer-decision-to-drop flag is not set, then the policer-decision-to-drop flag is set and the drop-deciding-policer-index is set according to the number-of-middle-policers-passed. At ingress, if a decision is made to send the SLA measurement request frame marked as EIR, the policer-decision-to-remark-request flag is set and the remark-deciding-policer-index field in the SLA request processing information sub-field is set to zero.

The OAM-frames-remark flag 160 (FIG. 8) indicates the manner in which to forward a measurement protocol frame that was supposed to be remarked (i.e. the DE field was to be set by the policer). If the OAM-frames-remark flag is set to "forward-as-CIR", the SLA measurement protocol frame that was supposed to be remarked by the policer is not remarked. If the SLA-measurements-frames-remark flag is set to "remark", the SLA measurements protocol frame that was supposed to be remarked by the policer is actually remarked.

Measurement protocol frames that should be dropped according to the middle policer, are not dropped and instead are marked with the appropriate policer-decision-to-drop-{request or response} flag value and forwarded with DE=0. The value of the OAM-frames-remark flag is set by the operator when registering the connection to be monitored.

If the OAM-frames-remark flag is set to 'forward-as-CIR,' the information available to the operator comprises the following counters: (1) forwarded measurement frames; (2) measurement frames dropped by middle policers; (3) measurement frames remarked by middle policers; and (4) measurement frames dropped by the network. No statistics, however, will be available regarding the number of frames remarked by a middle policer that were eventually dropped by the network due to their higher drop precedence.

If the OAM-frames-remark flag is set to 'remark,' the information available to the operator comprises the following counters: (1) forwarded measurement frames; (2) measurement frames dropped by middle policers; (3) measurement frames dropped by the network. In this case, the measurement of frames dropped by the network will also count frames which were remarked by a middle policer along the way and then dropped by the network due to congestion, etc.

Note that both the 'forward-as-CIR' mode as well as the 'remark' mode can be active simultaneously. The benefit of having both modes on at the same time is that all required frame loss information is made available to the operator.

The flag 'was-marked-as-de' 158 (FIG. 8) is set if the last decision on this frame was to mark it as DE. This flag is set at the ingress on the client side when sending the SLA measurement request in accordance with the initial marking decision. If a middle policer along the path makes a decision to remark the frame as DE, this flag is set. The flag is reset at the server side, if the server side remarks measurement frames to CIR. This DE flag is necessary due to the fact that the priority bits of the SLA measurement frames do not necessarily reflect the most current DE marking decision.

In alternative embodiments, the methods of the present invention may be applicable to implementations of the invention in integrated circuits, field programmable gate arrays (FPGAs), chip sets or application specific integrated circuits (ASICs), DSP circuits, wireless implementations and other communication system products.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of measuring frame loss for use at ingress to a network, said method comprising the steps of:
    maintaining a committed information rate (CIR) counter and an excess information rate (EIR) counter;
    preparing a measurement frame to be transmitted over said network;
    calculating a ratio of CIR to EIR traffic;
    randomly deciding a marking decision in accordance with said ratio; and
    marking said measurement frame in accordance with said marking decision.

2. The method according to claim 1, wherein said network comprises a Transparent LAN Services (TLS) connection in a metro Ethernet network (MEN).

3. The method according to claim 1, wherein said measurement frame comprises a request-response protocol frame.

4. The method according to claim 1, wherein said ratio is calculated utilizing the value of said CIR counter and EIR counters during a last iteration.

5. The method according to claim 1, wherein said step of marking comprises the step of marking said measurement frame as CIR if no traffic is sent during a last iteration.

6. The method according to claim 1, wherein said step of marking comprises the step of marking a response measurement frame as CIR at a server regardless of the marking of a corresponding request measurement frame received thereby.

7. The method according to claim 1, further comprising the step of increasing the priority of a response measurement frame at a server above that of the corresponding request measurement frame received thereby.

8. A method of measuring frame loss for use at ingress to a network, said method comprising the steps of:
    preparing a measurement frame to be transmitted over said network;
    deciding an action to take on said measurement frame in accordance with a decision value calculated according to the current status of an ingress policer;
    if said decision is to drop said measurement frame then randomly deciding a marking decision in accordance with the ratio between configured committed information rate (CIR) and excess information rate (EIR);
    marking said measurement frame in accordance with said marking decision; and
    otherwise marking said measurement frame in accordance with said decision.

9. The method according to claim 8, wherein said network comprises a Transparent LAN Services (TLS) connection in a metro Ethernet network (MEN).

10. The method according to claim 8, wherein said measurement frame comprises a request-response protocol frame.

11. The method according to claim 8, wherein said step of marking comprises the step of marking a response measurement frame as CIR at a server regardless of the marking of a corresponding request measurement frame received thereby.

12. The method according to claim 8, further comprising the step of increasing the priority of a response measurement frame at a server above that of a request measurement frame received thereby.

13. A method of measuring frame loss for use in the middle of a network, said method comprising the steps of:
    maintaining a committed information rate (CIR) counter and an excess information rate (EIR) counter;
    receiving a measurement frame over said network at a middle policer;
    applying color aware policing to said measurement frame in accordance with a service level agreement (SLA) and generating a policer decision based thereon;
    not dropping said measurement frame regardless of the policer decision made by said middle policer;
    setting one or more flags in a flags field within said measurement frame in accordance with said policer decision; and
    forwarding said measurement frame over said network in accordance with a forwarding flag regardless of the policer decision made by the middle policer.

14. The method according to claim 13, wherein said network comprises a Transparent LAN Services (TLS) connection in a metro Ethernet network (MEN).

15. The method according to claim 13, wherein said forwarding flag comprises a service level agreement (SLA) measurement frames remark flag set by an operator at the time a connection is registered to be monitored.

16. The method according to claim 13, wherein said forwarding flag is set to "forward-as-CIR" to indicate that said measurement frame should not be remarked in accordance with said color aware policing decision.

17. The method according to claim 13, wherein said forwarding flag is set to "remark" to indicate that said measurement frame should be remarked in accordance with said color aware policing decision.

18. The method according to claim 13, wherein said flags field comprises a flag adapted to indicate that the last decision on said measurement frame was to mark it as discard eligible (DE).

19. The method according to claim 13, wherein said measurement frame comprises a service level agreement (SLA) request protocol frame.

20. The method according to claim 19, wherein said flags field comprises a flag adapted to indicate that said color aware policing decision was to mark said SLA request protocol frame as discard eligible.

21. The method according to claim 19, wherein said flags field comprises a flag adapted to indicate that said color aware policing decision was to drop said SLA request protocol frame.

22. The method according to claim 13, wherein said measurement frame comprises a service level agreement (SLA) response protocol frame.

23. The method according to claim 22, wherein said flags field comprises a flag adapted to indicate that said color aware policing decision was to mark said SLA response protocol frame as discard eligible.

24. The method according to claim 22, wherein said flags field comprises a flag adapted to indicate that said color aware policing decision was to drop said SLA response protocol frame.

25. The method according to claim 13, further comprising the step of inserting policer related processing information into said measurement frame.

26. The method according to claim 25, wherein said processing information comprises a field adapted to indicate the number of middle policers that previously processed said measurement frame.

27. The method according to claim 25, wherein said processing information comprises a field adapted to indicate the index of the policer that decided to remark said measurement frame as discard eligible.

28. The method according to claim 25, wherein said processing information comprises a field adapted to indicate the index of the policer that decided to drop said measurement frame.

29. A provider edge switch for use at the ingress to an Ethernet based network, comprising:
- a plurality of line cards incorporating one or more ports for interfacing said provider edge switch to one or more users, each line card comprising:
- a plurality of ports, each port coupled to a communication link;
- a packet processing engine coupled to said plurality of ports, said packet processing engine for determining forwarding decision and destination queue for each ingress packet;
- a queue manager coupled to said packet processing engine;
- a loss measurement module for measuring frame loss for Transparent LAN Services (TLS) connections in a metro Ethernet network (MEN), said loss measurement module comprising:
  - maintaining a committed information rate (CIR) counter and an excess information rate (EIR) counter;
  - preparing a measurement frame to be sent over said network;
  - calculating a ratio of CIR to EIR traffic;
  - randomly deciding a marking decision in accordance with said ratio;
  - marking said measurement frame in accordance with said marking decision; and
- switching means coupled to said queue manager and adapted to provide switching fabric functionality to said provider edge switch.

30. A provider edge switch for use at the ingress to an Ethernet based network, comprising:
- a plurality of line cards incorporating one or more ports for interfacing said provider edge switch to one or more users, each line card comprising:
- a plurality of ports, each port coupled to a communication link;
- a packet processing engine coupled to said plurality of ports, said packet processing engine for determining forwarding decision and destination queue for each ingress packet;
- a queue manager coupled to said packet processing engine;
- a loss measurement module for measuring frame loss for a plurality of connections in a metro Ethernet network (MEN), said loss measurement module comprising:
  - maintaining a committed information rate (CIR) counter and an excess information rate (EIR) counter;
  - preparing a measurement frame to be sent over said network;
  - deciding an action to take on said frame in accordance with a decision value calculated according to the current status of an ingress policer;
  - if said decision is to drop said measurement frame then randomly deciding a marking decision in accordance with the ratio between the configured CIR and EIR, marking said measurement frame in accordance with said marking decision;
  - otherwise marking said measurement frame in accordance with said decision; and
- switching means coupled to said queue manager and adapted to provide switching fabric functionality to said provider edge switch.

31. A provider core switch for use in the middle of an Ethernet based network, comprising:
- a plurality of line cards incorporating one or more ports for interfacing said provider switch to other provider switches, each line card comprising:
- a plurality of ports, each port coupled to a network communications link;
- a packet processing engine coupled to said plurality of ports, said packet processing engine for determining forwarding decision and destination queue for each ingress packet, said packet processing engine comprising a middle policer;
- a queue manager coupled to said packet processing engine;
- a loss measurement module for measuring frame loss for a plurality of connections in a metro Ethernet network (MEN), said loss measurement module comprising:
  - receiving a measurement frame over said network;
  - applying color aware policing by said middle policer to said measurement frame in accordance with a service level agreement (SLA) and generating a policer decision based thereon;
  - not dropping said measurement frame regardless of the policer decision made by the middle policer;
  - setting one or more flags in a flags field within said measurement frame in accordance with said policer decision;
  - forwarding said measurement frame over said network in accordance with a forwarding flag regardless of the policer decision made by the middle policer; and
- switching means coupled to said queue manager and adapted to provide switching fabric functionality to said provider core switch.

* * * * *